(12) United States Patent
Fujita et al.

(10) Patent No.: US 7,832,371 B2
(45) Date of Patent: Nov. 16, 2010

(54) INTAKE SYSTEM AND MOTORCYCLE INCLUDING THE SAME

(75) Inventors: Hideo Fujita, Shizuoka (JP); Hidetoshi Ishigami, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/166,579

(22) Filed: Jul. 2, 2008

(65) Prior Publication Data

US 2009/0013953 A1   Jan. 15, 2009

(30) Foreign Application Priority Data

Jul. 10, 2007   (JP) .............................. 2007-180719

(51) Int. Cl.
*F02N 15/00* (2006.01)
(52) U.S. Cl. ................................. 123/184.21
(58) Field of Classification Search ............ 123/184.21; 55/308, 315, 322
See application file for complete search history.

(56) References Cited

U.S. PATENT DOCUMENTS

| | | | | |
|---|---|---|---|---|
| 2,354,179 A | * | 7/1944 | Blanc | 123/568.17 |
| 4,126,109 A | * | 11/1978 | Akado et al. | 123/530 |
| 4,449,498 A | * | 5/1984 | Horiuchi | 123/339.13 |
| 4,886,035 A | * | 12/1989 | Tomobe et al. | 123/588 |
| 6,409,783 B1 | | 6/2002 | Miyajima et al. | |
| 6,834,627 B2 | * | 12/2004 | Hiraku et al. | 123/90.15 |
| 6,877,466 B2 | * | 4/2005 | Shindou et al. | 123/90.16 |
| 6,932,034 B2 | * | 8/2005 | Machida et al. | 123/90.15 |
| 7,069,890 B2 | | 7/2006 | Fujita et al. | |
| 7,077,085 B2 | * | 7/2006 | Arai et al. | 123/90.16 |
| 7,331,322 B2 | | 2/2008 | Seki et al. | |
| 2004/0107933 A1 | * | 6/2004 | Lee | 123/184.21 |
| 2004/0237923 A1 | * | 12/2004 | Kayama et al. | 123/179.4 |
| 2005/0045147 A1 | * | 3/2005 | Ishikawa et al. | 123/336 |
| 2005/0279311 A1 | * | 12/2005 | Fegg et al. | 123/184.36 |
| 2007/0028876 A1 | | 2/2007 | Fujita | |
| 2007/0044747 A1 | * | 3/2007 | Sawatari et al. | 123/184.21 |
| 2008/0289305 A1 | * | 11/2008 | Girondi | 55/385.3 |
| 2008/0314687 A1 | * | 12/2008 | Shiozaki et al. | 184/6.5 |

FOREIGN PATENT DOCUMENTS

| | | |
|---|---|---|
| JP | 10-035559 A | 2/1998 |
| JP | 2000-161124 A | 6/2000 |
| JP | 2003-254100 A | 9/2003 |
| JP | 2003-314233 A | 11/2003 |
| JP | 2006-076496 A | 3/2006 |
| JP | 2006-132372 A | 5/2006 |

* cited by examiner

*Primary Examiner*—Stephen K Cronin
*Assistant Examiner*—Sizo B Vilakazi
(74) *Attorney, Agent, or Firm*—Keating & Bennett, LLP

(57) ABSTRACT

A motorcycle includes an air inlet pipe, an airflow box, an air cleaner box, and a throttle body as an air passage arranged to allow outside air to be taken into the engine. The air inlet pipe is provided in a front portion of a main frame. The air inlet pipe is provided with an airflow sensor and a throttle valve. An air cleaner element is provided between the airflow sensor and the engine.

13 Claims, 20 Drawing Sheets

F I G. 4
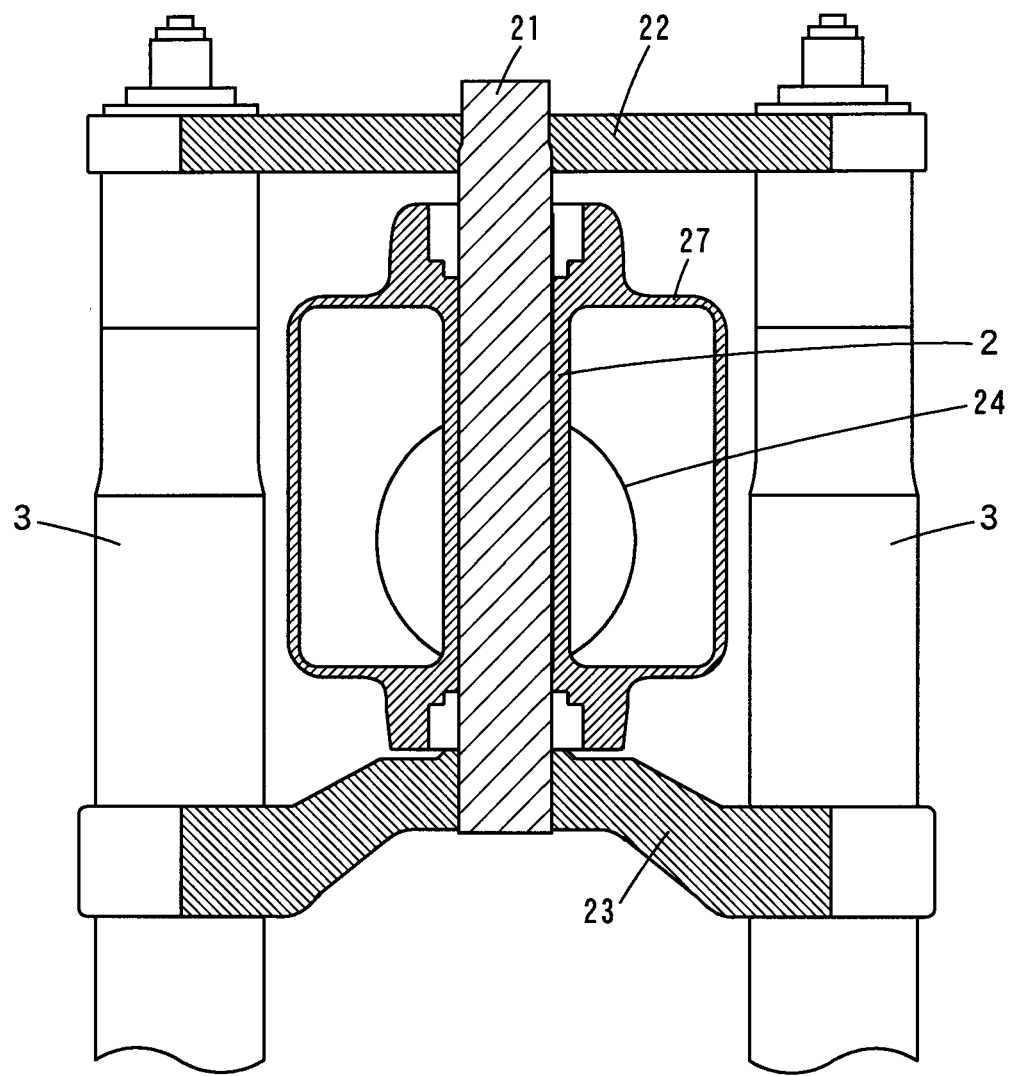
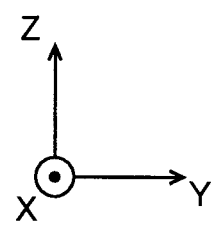

INTAKE SYSTEM AND MOTORCYCLE INCLUDING THE SAME

BACKGROUND OF THE INVENTION

1. Field of the Invention

The present invention relates to an intake system for allowing air to be taken into an engine and a motorcycle including such a system.

2. Description of the Related Art

Various kinds of variable valve mechanisms that control intake/exhaust have been developed in order to improve fuel consumption, reduce harmful substances in exhaust gas, and achieve high power output in a target engine speed range (see, for example, JP 2003-314233 A).

A valve device disclosed in JP 2003-314233 A includes a cam having a main cam surface and a valve lifter pressed by the main cam surface to move the valve.

The above-described cam rotates together with the camshaft and is movable in the axial direction so that the cam moves in response to the engine speed. Therefore, the contact point between the cam and the valve lifter axially moves on the main cam surface described above depending on the engine speed. Here, the main cam surface described above is inclined along the axial direction. Therefore, in the valve device, the valve lift amount is continuously changed in response to the engine speed and the accelerator position.

More specifically, a valve device disclosed by JP 2003-314233 A allows an intake air amount to be continuously adjusted in response to the engine speed and the accelerator position. The engine can smoothly be operated in this way.

With the structure of the valve device disclosed by JP 2003-314233 A, however, the amount of air taken into cylinders cannot be adjusted appropriately when there is a malfunction in the valve device. Therefore, the output of the engine cannot be adjusted sufficiently and the traveling performance of the motorcycle is lowered.

SUMMARY OF THE INVENTION

In order to overcome the problems described above, preferred embodiments of the present invention provide an intake system that can improve the traveling performance of a motorcycle, and a motorcycle including such a system.

An intake system according to a first preferred embodiment of the present invention allows air to be taken into an engine in a motorcycle and includes an intake passage that is provided at a main frame of the motorcycle and guides outside air into a cylinder in the engine, a first filter provided at the intake passage, a flow rate detector that is provided on the upstream side of the first filter in the intake passage and detects the flow rate of air, and a flow rate adjuster that adjusts the flow rate of air to be taken into a cylinder through the intake passage based on the flow rate detected by the flow rate detector.

In the intake system, outside air is guided into the cylinder in the engine through the intake passage. Here, the intake passage is preferably provided with the flow rate detector that detects the flow rate of air and the flow rate adjuster that adjusts the amount of air taken into the cylinder in the engine based on the flow rate detected by the flow rate detector.

In this case, if there is a malfunction with the intake device in the engine, an appropriate amount of air can be taken into the cylinder by the flow rate detector and the flow rate adjuster. Therefore, the output of the engine can be stabilized.

The flow rate detector is preferably provided at the intake passage provided at the main frame. Therefore, the vibration of the flow rate detector is minimized so that the detection precision of the flow rate detector is improved.

In addition, the flow rate detector is preferably provided on the upstream side of the first filter. Therefore, the flow rate detector can be prevented from being affected by blow-back caused by the intake pulsation of the engine.

Consequently, the traveling performance of the motorcycle can be improved.

Furthermore, in the intake system, since a space for preventing the effect of blow-back upon the flow rate detector is not necessary in the intake passage, the intake passage can be simplified and more compact. In this way, the motorcycle can be produced more easily and reduced in size.

The intake system may further include a continuously variable valve device that drives the intake valve so that the maximum displacement of the intake valve of the engine can be continuously varied in response to the engine speed and the accelerator operation by a rider.

In this case, the maximum displacement of the intake valve may be continuously adjusted in response to the engine speed and the accelerator operation by the rider. This further stabilizes the output of the engine using the continuously variable valve device. Consequently, the traveling performance of the motorcycle can be further improved.

The intake system may further include a state detector that detects the state of the continuously variable valve device and a controller that adjusts the amount of air taken into the cylinder by controlling the continuously variable valve device, and the controller may stop adjusting the amount of air by the continuously variable valve device and start adjusting the amount of air by the flow rate adjuster when the state detector detects a prescribed state of the continuously variable valve device.

According to the intake system, the continuously variable valve device is controlled by the controller so that the amount of air taken into the cylinder is adjusted. The state of the continuously variable valve device is detected by the state detector.

Here, when the state detector detects a prescribed state of the continuously variable valve device, the controller stops adjusting the air amount by the continuously variable valve device and starts adjusting the air amount by the flow rate adjuster.

In this case, if there is a malfunction with the continuously variable valve device, an appropriate amount of air can be taken into the cylinder by the flow rate adjuster. Therefore, the output of the engine can be stabilized. Consequently, the traveling performance of the motorcycle can surely be improved.

The controller may control the flow rate adjuster so that the amount of air taken into the cylinder is reduced in a prescribed ratio when the state detector detects the prescribed state.

In this case, if there is a malfunction with the continuously variable valve device, the motorcycle can gradually be decelerated. Consequently, the traveling performance of the motorcycle can be further improved.

The intake system may further include an engine speed detector that detects the rotation speed of the engine, and the controller may stop adjusting the amount of air by the continuously variable valve device and start adjusting the amount of air by the flow rate adjuster when the engine speed detected by the engine speed detector is smaller than a prescribed value.

In this case, when the motorcycle travels at low speed, an appropriate amount of air can stably be supplied to the cylinder. In this way, the traveling performance of the motorcycle can surely be improved.

The intake system may further include a second filter provided on the upstream side of the flow rate adjuster and the flow rate detector in the intake passage.

In this case, using the second filter, the flow rate detector and the flow rate adjuster can be prevented from gathering dust or the like from the outside air. Therefore, the operation performance of the flow rate detector and the flow rate adjuster can surely be improved. Consequently, the traveling performance of the motorcycle can surely be improved.

The main frame is preferably arranged to extend in the lengthwise direction of the motorcycle, the intake passage may include an inlet pipe that is provided in a front portion of the main frame and allows outside air to come into the inlet pipe, and at least one of the flow rate detector and the flow rate adjuster may be provided at the inlet pipe.

In this case, at least one of the flow rate detector and the flow rate adjuster and the inlet pipe may be attached as a unit to the main frame. This allows the flow rate detector or the flow rate adjuster to be more easily attached to the motorcycle. Consequently, the manufacture of the motorcycle can be easier.

The inlet pipe and the main frame may be integrally formed. In this case, the vibration of the inlet pipe can sufficiently be minimized so that the vibration of the flow rate detector or the flow rate adjuster can sufficiently be minimized. In this way, the operation performance of the flow rate detector or the flow rate adjuster can sufficiently be improved.

The inlet pipe may be provided at the main frame with a vibration buffer member sandwiched therebetween. In this case, the vibration of the inlet pipe can be sufficiently minimized so that the vibration of the flow rate detector or the flow rate adjuster can be sufficiently minimized. In this way, the operation performance of the flow rate detector or the flow rate adjuster can be sufficiently improved.

The main frame may be branched into a plurality of portions to extend from its front end to its rear side and the flow rate detector may be provided between the plurality of portions. In this case, the plurality of portions of the main frame can protect the flow rate detector against extraneous effects. Therefore, the detection precision and reliability of the flow rate detector can be improved.

The main frame may be branched into a plurality of portions to extend from its front end to its rear side, and the flow rate adjuster may be provided between the plurality of portions. In this case, the plurality of portions of the main frame can protect the flow rate adjuster against extraneous effects. Therefore, the detection precision and reliability of the flow rate adjuster can be improved.

A motorcycle according to another preferred embodiment of the present invention includes a main frame, a driving wheel provided rotatably to the main frame, an engine that generates power, a transmission mechanism that transmits the power generated by the engine to the driving wheel, and an intake system that allows air to come into a cylinder in the engine, wherein the intake system includes an intake passage that is provided at the main frame and guides outside air into the cylinder in the engine, a first filter provided in the intake passage, a flow rate detector that is provided on the upstream side of the first filter in the intake passage and detects the flow rate of air, and a flow rate adjuster that adjusts the flow rate of air taken into the cylinder through the intake passage based on the flow rate detected by the flow rate detector.

In the motorcycle, the power generated by the engine is transmitted to the driving wheel through the transmission mechanism. Here, in the intake system provided in the motorcycle, outside air is guided into the cylinder through the intake passage. The intake passage is provided with the flow rate detector that detects the flow rate of air and the flow rate adjuster that adjusts the flow rate of air taken into the cylinder in the engine based on the flow rate detected by the flow rate detector.

In this case, if there is a malfunction in the intake device in the engine, an appropriate amount of air can be taken into the cylinder by the flow rate detector and the flow rate adjuster. This allows the output of the engine to be stabilized.

The flow rate detector is provided at the intake passage provided on the main frame. Therefore, the vibration of the flow rate detector is minimized, so that the detection precision of the flow rate detector can be improved.

The flow rate detector is preferably provided on the upstream side of the first filter. Therefore, the flow rate detector can be prevented from being affected by blow-back caused by intake pulsation in the engine.

Consequently, the traveling performance of the motorcycle can surely be improved.

In addition, in the intake system, since a space for preventing the effect of blow-back upon the flow rate detector is not necessary in the intake passage, the intake passage can be simplified and more compact. In this way, the motorcycle can be produced more easily and reduced in size.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 4 is a sectional view taken along line A-A in FIG. 3.

DETAILED DESCRIPTION OF PREFERRED EMBODIMENTS

Now, an intake system according to the preferred embodiments of the present invention and a motorcycle including the system will be described.

First Preferred Embodiment

(1) Structure of the Motorcycle

Figure 1:
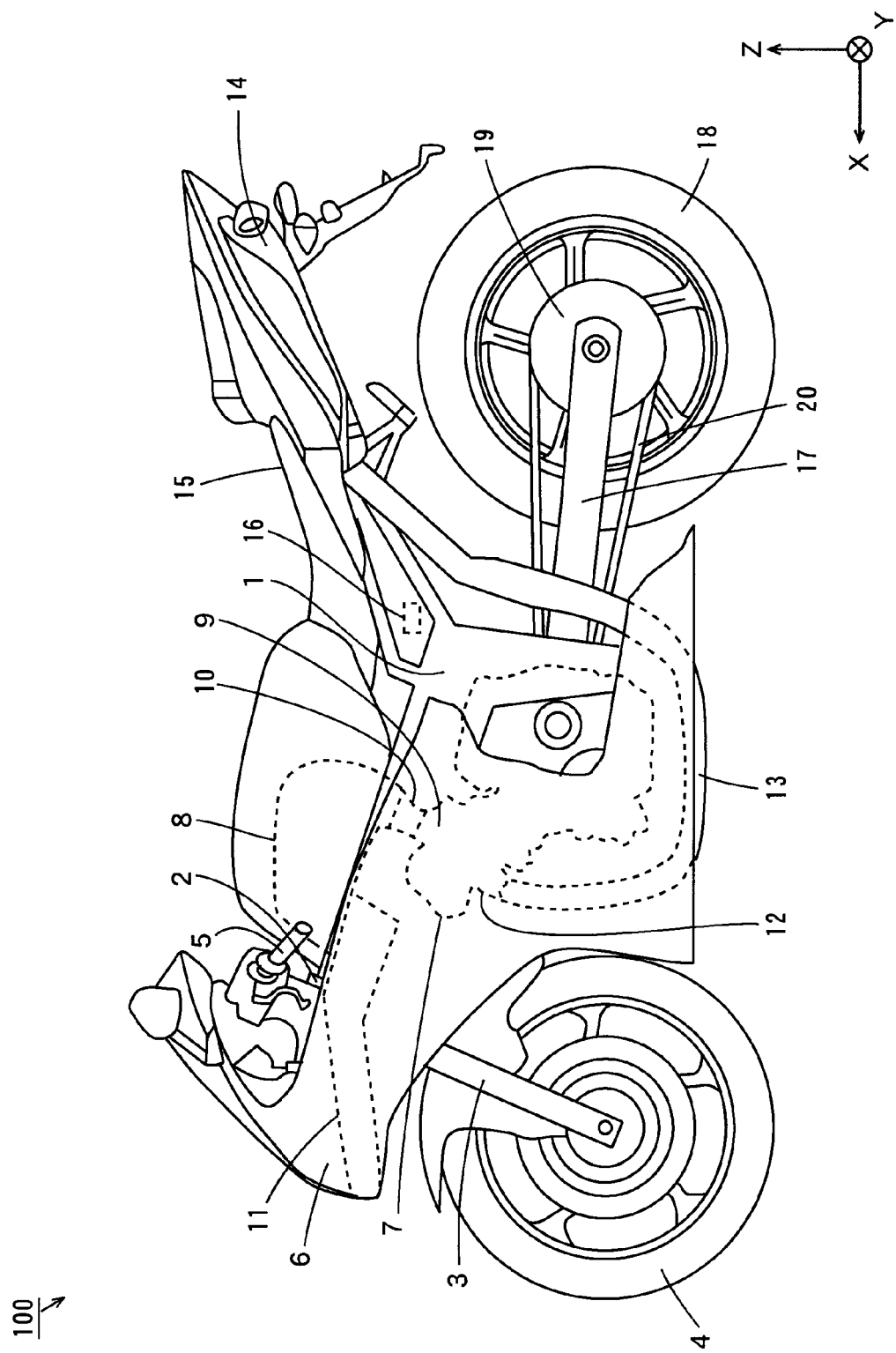
FIG. 1 is an external side view of a motorcycle including an intake system according to a first preferred embodiment of the present invention.

FIG. 1 is an external side view of a motorcycle including an intake system according to a first preferred embodiment of the present invention. Note that in FIG. 1, the three directions orthogonal to one another as indicated by the arrows X, Y, and Z are defined as the X-, Y-, and Z-directions, respectively. More specifically, in FIG. 1, the lengthwise direction of the motorcycle 100 as the X-direction, the width direction of the motorcycle 100 is defined as the Y-direction, and the height direction of the motorcycle 100 as the Z-direction. In FIGS. 2 to 5 in the following, the three directions orthogonal to one another are also defined as the X-, Y-, and Z-directions, respectively.

As shown in FIG. 1, the motorcycle 100 includes a main frame 1. A head pipe 2 is provided at the front end of the main frame 1. A front fork 3 is pivotably provided at the head pipe 2. A front wheel 4 is rotatably supported at the lower end of the front fork 3. A handle 5 is attached at the upper end of the front fork 3 through a top bridge 22 (see FIG. 2) that will be described below.

A cowling 6 is provided to cover front and side portions of the main frame 1. A four-cylinder engine 7 (hereinafter simply referred to as "engine 7") is provided in the center of the main frame 1. An air cleaner box 8 is provided above the engine 7. Intake pipes 10 are provided to connect the air cleaner box 8 and the intake ports 9 of the engine 7.

An intake passage 11 that communicates the air cleaner box 8 and the outside is provided at the front portion of the motorcycle 100 while being covered with the cowling 6. One end of the intake passage 11 is open at the front surface of the cowling 6. Air outside the motorcycle 100 is taken into the engine 7 through the intake passage 11, the air cleaner box 8, and the intake pipes 10.

One end of an exhaust pipe 13 is connected to the exhaust ports 12 of the engine 7. The other end of the exhaust pipe 13 is connected to a muffler device 14. Burned gas generated by combustion of a gas mixture in the engine 7 is discharged to the outside through the exhaust pipe 13 and the muffler device 14.

A seat 15 is provided above the engine 7. An ECU (Electronic Control Unit) 16 that controls the operation of various elements of the motorcycle 100 is provided under the seat 15. Details of the ECU 16 will be described below.

A rear arm 17 is connected to the main frame 1 to extend at the rear of the engine 7. The rear arm 17 holds the rear wheel 18 and the rear wheel driven sprocket 19 so that they can rotate. The rear wheel driven sprocket 19 is provided with a chain 20. The power generated by the engine 7 is transmitted to the rear wheel driven sprocket 19 through the chain 20. This rotates the rear wheel 18.

(2) Structure of the Intake Passage and its Periphery

The structure of the intake passage 11 and its periphery shown in FIG. 1 will now be described.

Figure 2:
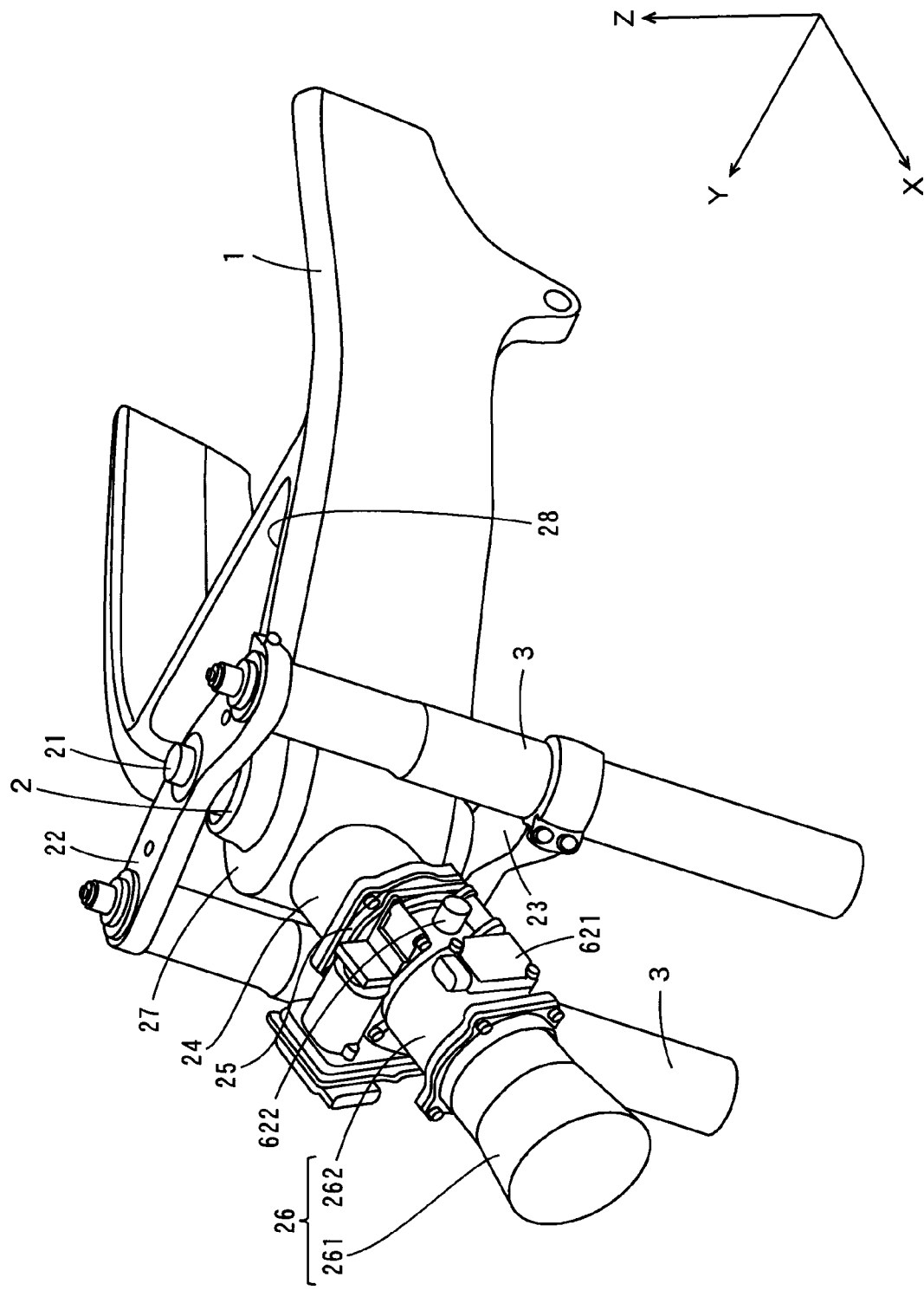
FIG. 2 is an external perspective view of a front portion of a main frame and its periphery.
Figure 3:
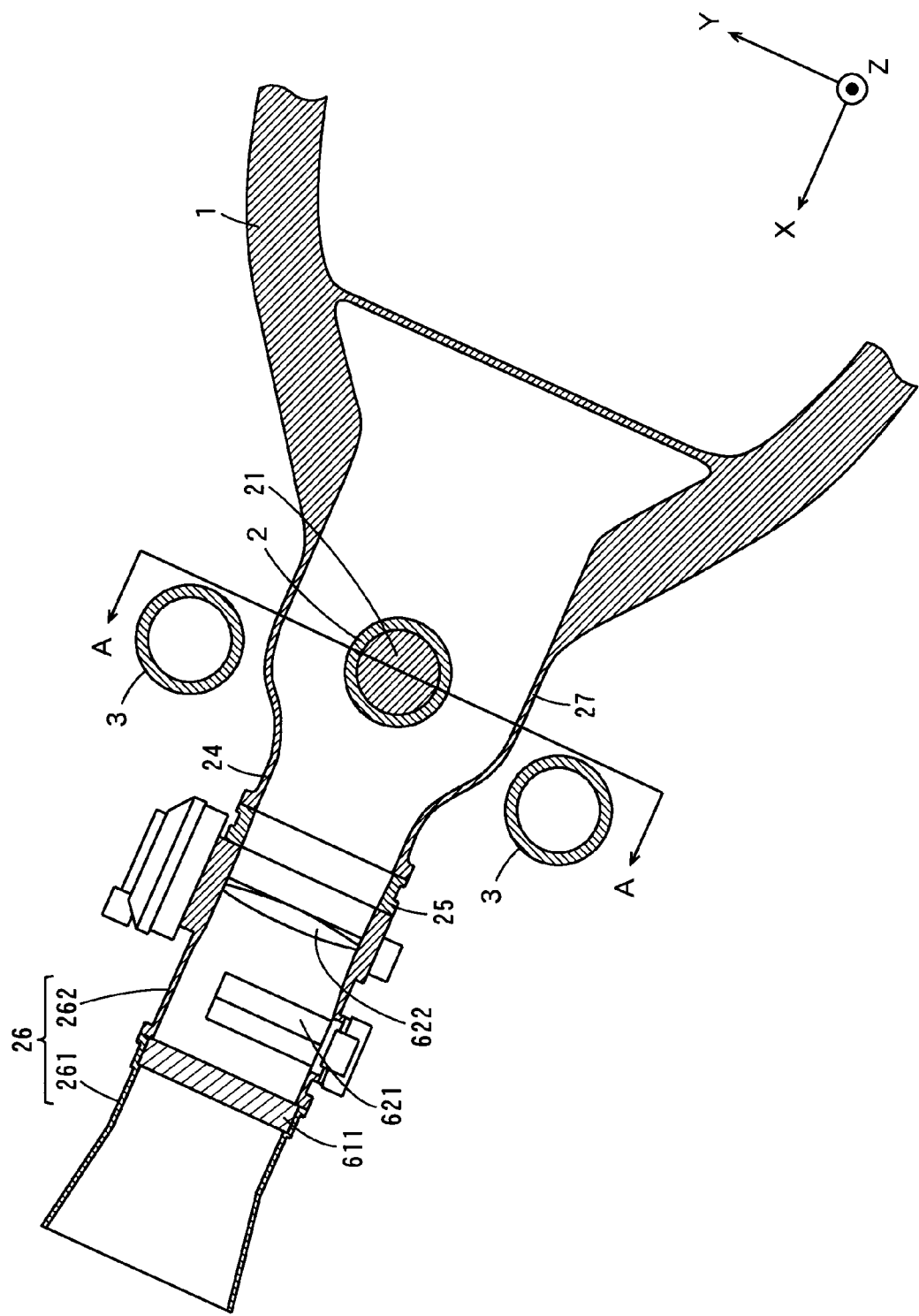
FIG. 3 is a cross-sectional view of the front portion of the main frame and its periphery.
Figure 5:
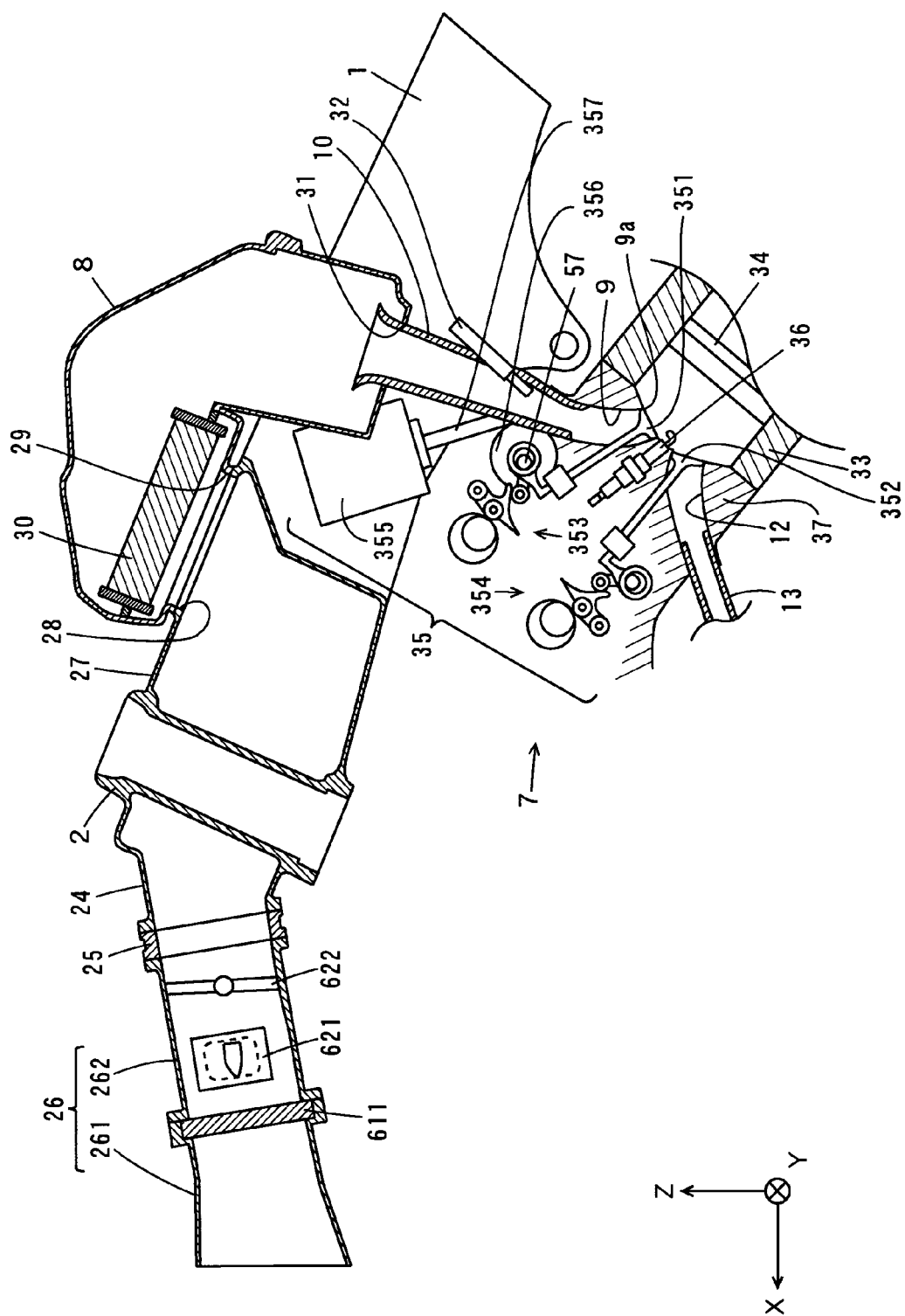
FIG. 5 is a longitudinal sectional view of the front portion of the main frame and its periphery.

FIGS. 2 to 5 are views for use in illustrating the structure of the intake passage 11 and its periphery. FIG. 2 is an external perspective view of the front portion of the main frame 1 and its periphery, and FIG. 3 is a cross-sectional view of the front portion of the main frame 1 and its periphery. FIG. 4 is a sectional view taken along line A-A in FIG. 3 and FIG. 5 is a longitudinal sectional view of the front portion of the main frame 1 and its periphery.

As shown in FIGS. 2 to 4, a steering shaft 21 is rotatably provided at the head pipe 2 of the main frame 1.

As shown in FIGS. 2 and 4, the upper end of the steering shaft 21 is fixed at the center of the top bridge 22 and the lower end of the steering shaft 21 is fixed at the center of the bottom bridge 23.

As shown in FIGS. 2 to 4, the front fork 3 is fixed to both ends of the top bridge 22 and is fixed to both ends of the bottom bridge 23. In this way, the front fork 3 is provided pivotably to the head pipe 2.

As shown in FIGS. 2 to 5, a cylindrical coupling member 24 is provided at the front end of the main frame 1. An air inlet pipe 26 is connected to the front end of the coupling member 24 through a vibration buffer member 25. The vibration buffer member 25 is, for example, made of a resin material such as rubber. The air inlet pipe 26 has a first inlet pipe 261 on the front side and a second inlet pipe 262 on the rear side.

The front end of the first inlet pipe 261 is open at the front surface of the cowling 6 (FIG. 1). As shown in FIGS. 3 and 5, an air cleaner element 611 is provided at the rear end of the first inlet pipe 261. The air cleaner element 611 removes dust and the like included in the air passing through the first inlet pipe 261.

As shown in FIGS. 2, 3, and 5, the second inlet pipe 262 is provided with an airflow sensor 621 and a throttle valve 622. The airflow sensor 621 detects the flow rate of air passing through the air inlet pipe 26. The throttle valve 622 adjusts the flow rate of air coming into the engine 7 from the outside through the air inlet pipe 26. The operation of the throttle valve 622 is controlled by the ECU 16 (FIG. 1), which will be described below.

As shown in FIGS. 2 to 5, an airflow box 27 is provided to surround the outer periphery of the head pipe 2 at the front end of the main frame 1. The coupling element 24 is formed at the front end of the airflow box 27 and the inside of the coupling element 24 is in communication with the inside of the airflow box 27.

As shown in FIGS. 2 and 5, an opening 28 is formed at the upper surface of the rear portion of the airflow box 27. As shown in FIG. 5, an approximately J-shaped air cleaner box 8 is provided at the rear of the airflow box 27. One end opening 29 of the air cleaner box 8 is connected to the opening 28 of the airflow box 27. In this way, the airflow box 27 and the air cleaner box 8 are in communication with each other.

In the air cleaner box 8, an air cleaner element 30 is provided near the one end opening 29. The air cleaner element 30 removes dust and the like contained in the air coming into the air cleaner box 8 from the airflow box 27.

One end of each intake pipe 10 is connected to each end opening 31 of the air cleaner box 8. The other end of each intake pipe 10 is connected to the opening on the upstream side of each intake port 9 of the engine 7. Each of the intake pipes 10 is provided with an injector 32 used to supply fuel to the engine 7.

The engine 7 includes a cylinder 33, a piston 34, a variable valve device 35, an ignition plug 36, and a cylinder head 37. The variable valve device 35 has an intake valve 351, an exhaust valve 352, an intake valve driving mechanism 353, an exhaust valve driving mechanism 354, and a motor 355. The engine 7 preferably has four cylinders 33, for example, though not all are shown. The piston 34, the ignition plug 36, the cylinder head 37, the intake valve 351, the exhaust valve 352, the intake valve driving mechanism 353, and the exhaust valve driving mechanism 354 are provided for each of the cylinders 33.

The intake valve 351 and the exhaust valve 352 are driven by the intake valve driving mechanism 353 and the exhaust valve driving mechanism 354, respectively. The intake valve driving mechanism 353 is coupled with a control shaft 57 and a coupling gear 356 that will be described below. The motor 355 has a rotation shaft 357. Torque generated by the motor 355 is transmitted to the intake valve driving mechanism 353 through the rotation shaft 357, the coupling gear 356, and the control shaft 57. In this way, the state of the intake valve driving mechanism 353 is adjusted, so that the lift amount (displacement) of the intake valve 351 is adjusted. More specifically, according to the present preferred embodiment, the motor 355 of the variable valve device 35 is controlled so that the lift amount of the intake valve 351 can be adjusted, details of which will be described below. The ignition plug 36 ignites the air-fuel mixture in the cylinder 33 (combustion chamber).

In the foregoing configuration, outside air is taken into the cylinders 33 in the engine 7 through the air inlet pipe 26, the coupling element 24, the airflow box 27, the air cleaner box 8, and the intake pipes 10 from the tip end of the first inlet pipe 261 in FIG. 5. The air taken into the cylinders 33 is mixed with fuel injected by the injectors 32 and then ignited by the ignition plugs 36. In this way, power is generated in the engine 7.

In the motorcycle 100 according to the present preferred embodiment, the intake passage 11 is provided with the airflow sensor 621 and the throttle valve 622. In this case, in the event of a malfunction in the operation of the variable valve device 35, the use of the airflow sensor 621 and the throttle valve 622 allows an appropriate amount of air to be taken into the cylinders 33 in the engine 7. Consequently, the output of the engine 7 can be stabilized, details of which will be described below.

(3) Variable Valve Device (3-1) Structure and Operation of Variable Valve Device Now, the variable valve device 35 will be described. In the following paragraphs, the intake valve driving mechanism 353 will be described, while the exhaust valve driving mechanism 354 has the same structure.

Figure 6:
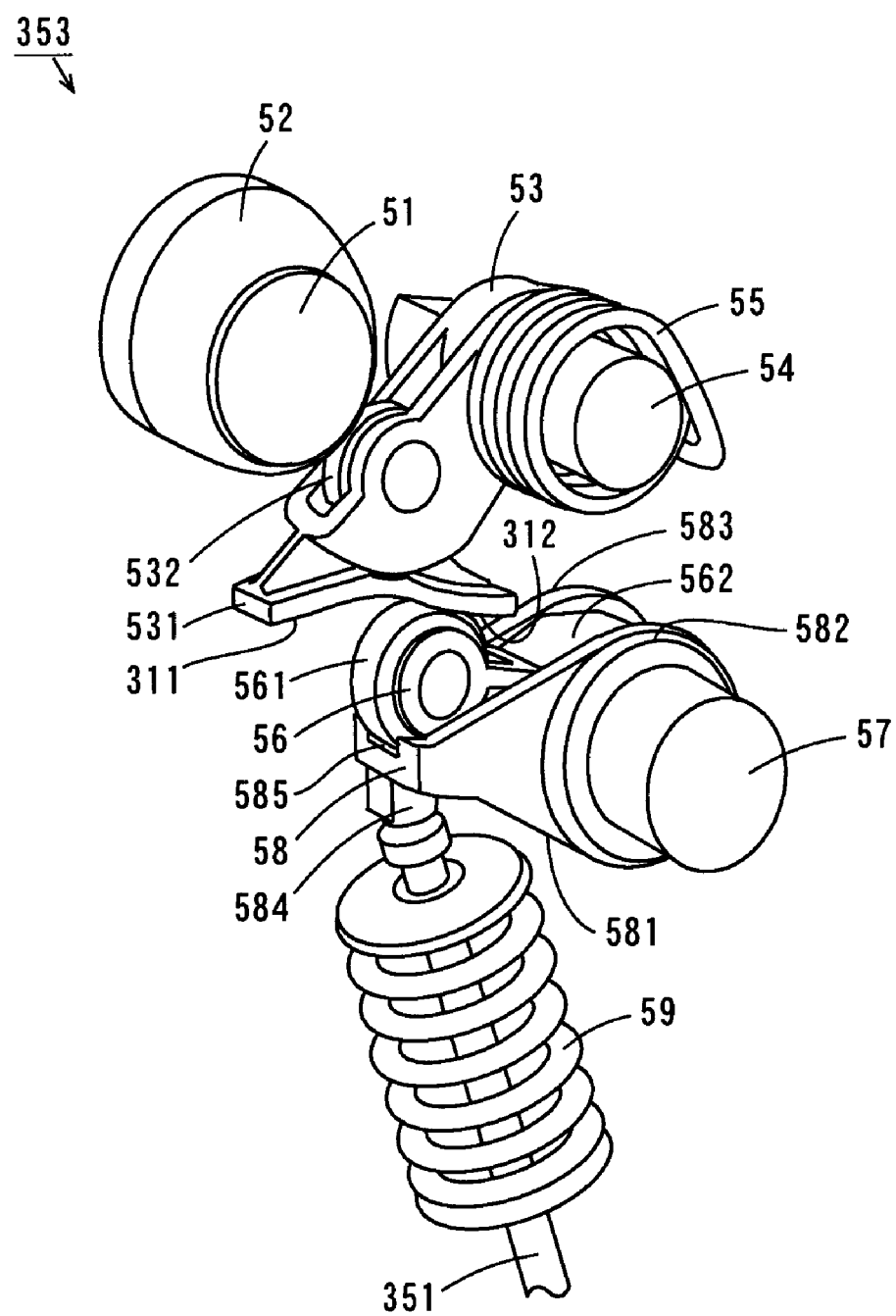
FIG. 6 is a perspective view of an intake valve driving mechanism.
Figure 7:
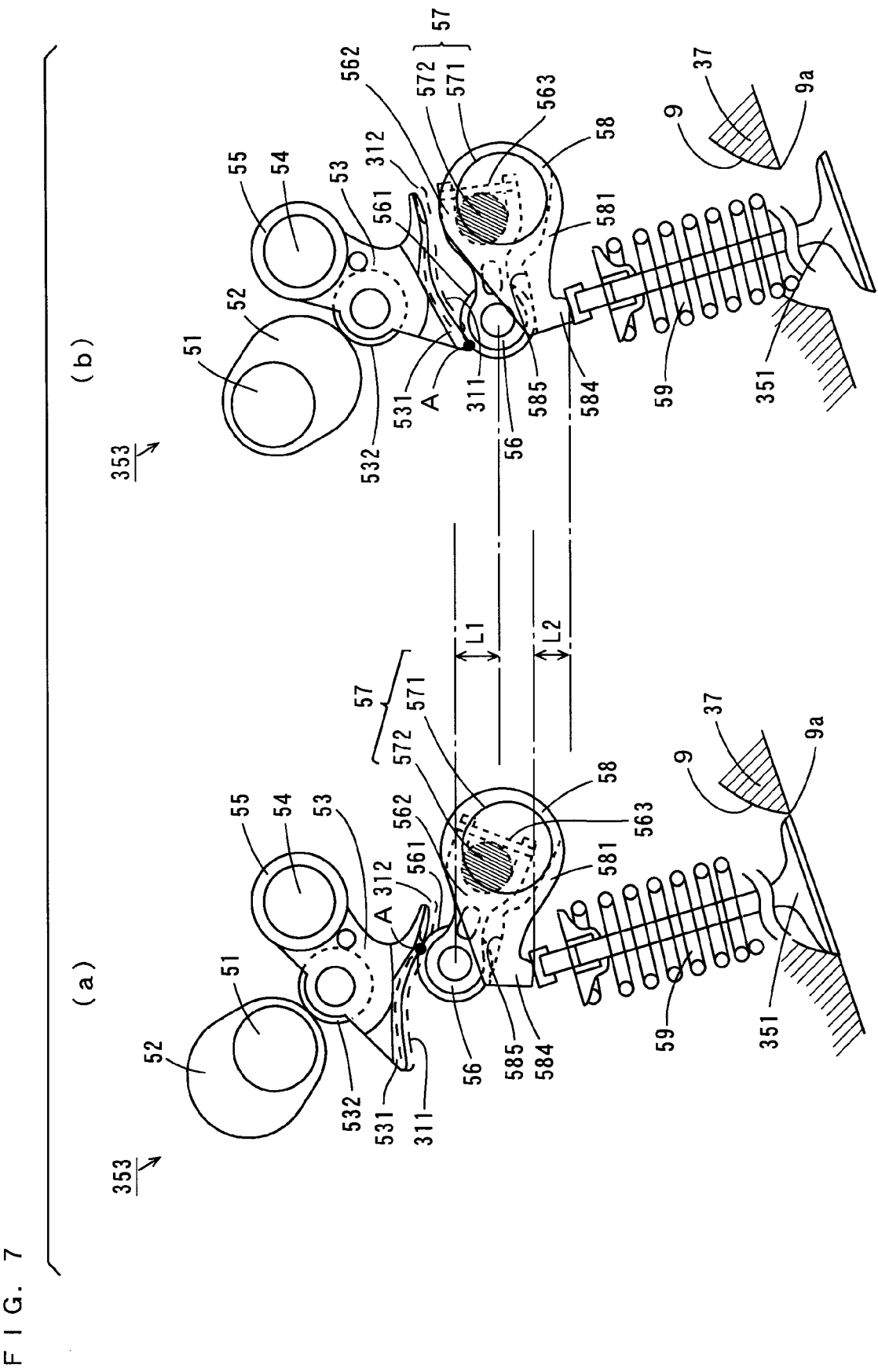
FIGS. 7 and 8 are side views of the intake valve driving mechanism.
Figure 8:
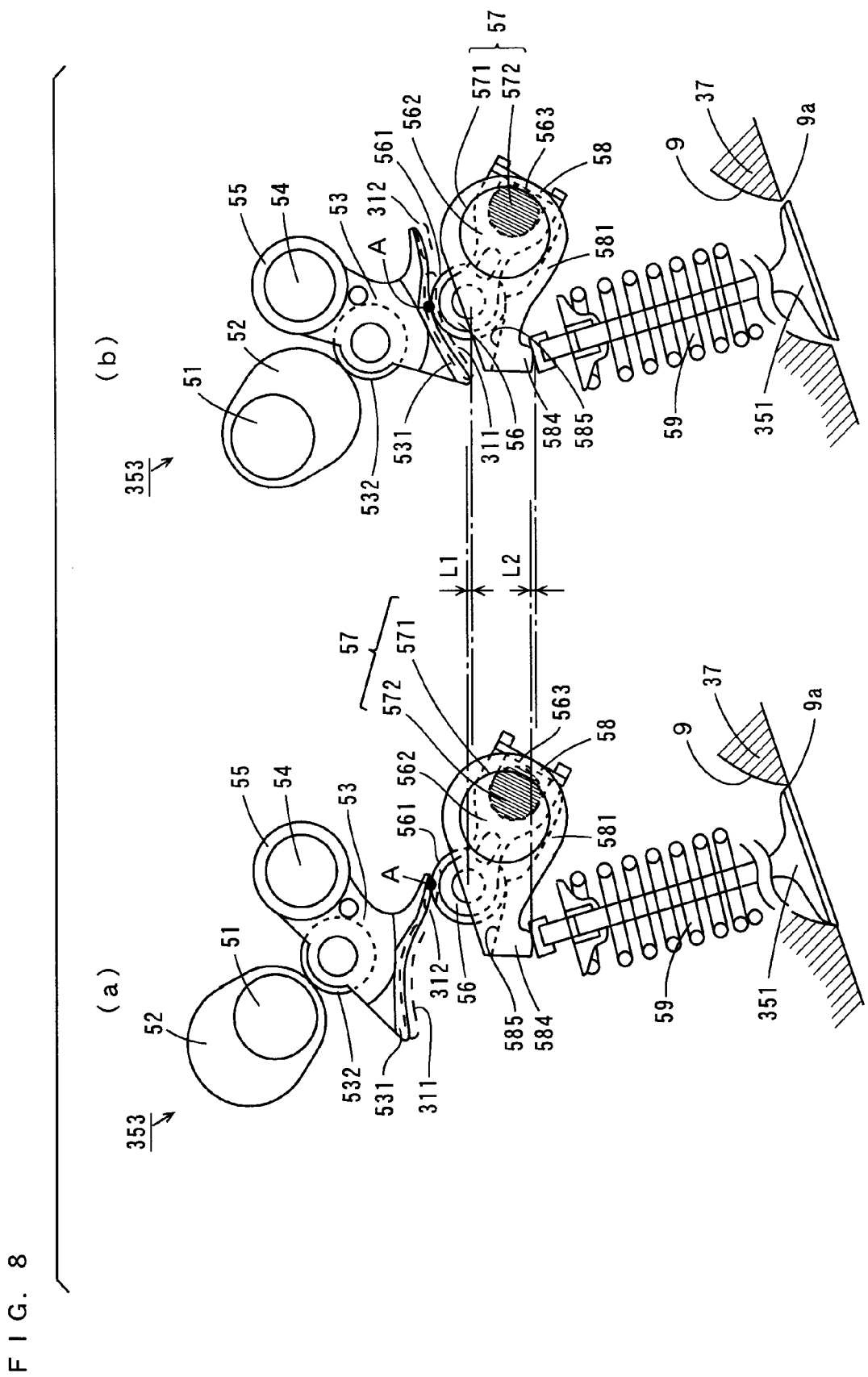

FIG. 6 is a perspective view of the intake valve driving mechanism 353, and FIGS. 7 and 8 are side views of the intake valve driving mechanism 353. Note that in FIGS. 7 and 8, (a) shows the state of the intake valve driving mechanism 353 when the lift amount of the intake valve 351 in one cycle is minimized, in other words, when the opening end 9a of the intake port 9 is closed by the intake valve 351. In FIGS. 7 and 8, (b) shows the state of the intake valve driving mechanism 353 when the lift amount of the intake valve 351 in one cycle is maximized. Hereinafter, the maximum value for the lift amount of the intake valve 351 in one cycle will be referred to as the "maximum lift amount."

FIG. 7 shows the state of the intake valve driving mechanism 353 when the maximum lift amount of the intake valve 351 is maximized, and FIG. 8 shows the state of the intake valve driving mechanism 353 when the maximum lift amount of the intake valve 351 is minimized.

As shown in FIGS. 6 to 8, the intake valve driving mechanism 353 includes a rotation cam 52, a swing cam 53, a fixed shaft 54, a return spring 55, a control arm 56, and a rocker arm 58. The rotation cam 52 is fixed to the camshaft 51. The intake valve 351 is provided with a valve spring 59.

Note that the intake valve driving mechanism 353 is provided for each of the intake valves 351. Therefore, according to the present preferred embodiment, the engine 7 includes equal numbers of intake valves 351 and intake valve driving mechanisms 353. The rotation cam 52 of each of the intake valve driving mechanisms 353 is fixed to one common camshaft 51.

A cam portion 531 is provided at one end of the swing cam 53. The cam portion 531 is provided with a lift surface 311 and a base circular surface 312. A roller 532 is rotatably attached approximately in the center of the swing cam 53. The other end of the swing cam 53 is rotatably provided to the fixed shaft 54. The fixed shaft 54 is fixed to a cylinder head 37 (FIG. 5).

The return spring 55 is attached to the cylinder head 37 and the swing cam 53. The return spring 55 energizes the swing cam 53 in one rotation direction around the fixed shaft 54 as the rotation center. In this way, the outer circumferential surfaces of the roller 532 and the rotation cam 52 are abutted against each other.

A roller 561 is rotatably provided at one end of the control arm 56. A shaft holder 562 having an approximately U-shaped cross-section 562 is formed at the other end of the control arm 56. As shown in FIGS. 7 and 8, a restriction member 563 is attached to the tip end of the shaft holder 562.

As shown in FIGS. 6 to 8, the rocker arm 58 includes a bottom surface portion 581 and side surface portions 582 and 583. A pressing portion 584 projecting downwardly is provided at one end of the bottom surface portion 581. The lower end of the pressing portion 584 abuts against the upper end of the intake valve 351. A roller receiving surface 585 is provided on one end side of the upper surface of the bottom surface portion 581. The roller 561 of the control arm 56 is arranged between the cam portion 531 of the swing cam 53 and the roller receiving surface 585 of the rocker arm 58.

The shaft holder 562 and the side surface portions 582 and 583 hold and position the control shaft 57. Note that according to the present preferred embodiment, the single common control shaft 57 is held by the shaft holder 562 and the side surface portions 582 and 583 in each of the intake valve driving mechanisms 353, details of which will be described below.

The valve spring 59 energizes the intake valve 351 upwardly in the axial direction. In this way, the upper end of the intake valve 351 and the lower end of the pressing portion 584 are abutted against each other.

Figure 9:
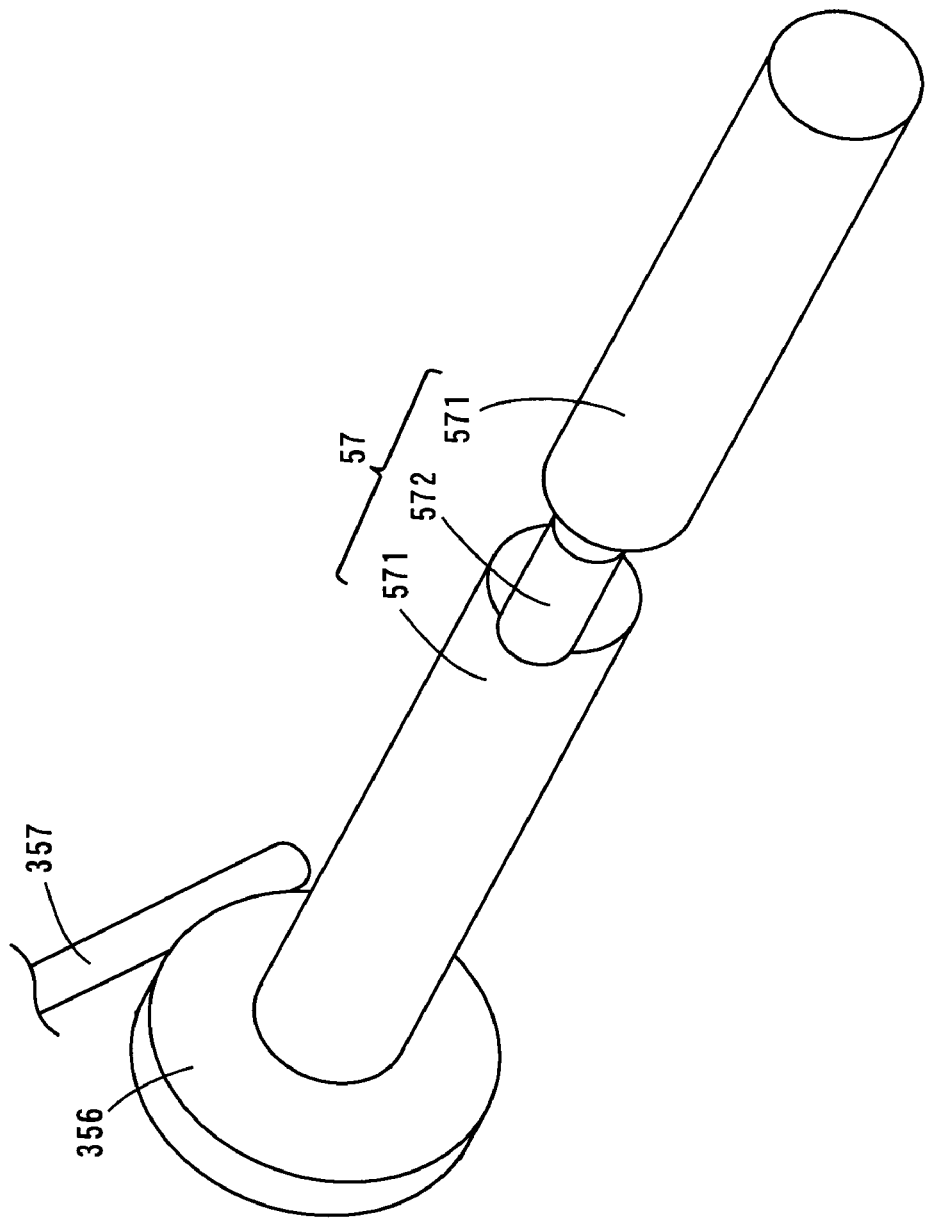
FIG. 9 is a schematic perspective view of a control shaft.

FIG. 9 is a schematic perspective view of the control shaft 57. As shown in FIG. 9, the control shaft 57 has a large diameter portion 571 and a small diameter portion 572 that are integral with each other. The small diameter portion 572 is arranged eccentrically with respect to the axial center of the large diameter portion 571. The large diameter portion 571 is rotatably held at the side surface portions 582 and 583 in FIGS. 6 to 8, and the small diameter portion 572 is rotatably held by the shaft holder 562 and the restriction member 563 in FIGS. 6 to 8. The coupling gear 356 is arranged at a prescribed position of the large diameter portion 571. The rotation shaft 357 of the motor 355 (FIG. 5) is threadably engaged to the coupling gear 356.

With this structure, the torque of the crankshaft (not shown) of the engine 7 (FIG. 5) is transmitted to the camshaft 51 in FIGS. 6 to 8 through a chain that is not shown. In this way, the rotation cam 52 rotates around the camshaft 51 as the rotation axis.

As the rotation cam 52 rotates, the swing cam 53 swings around the fixed shaft 54 as the swing center. As the swing cam 53 pivots, the cam portion 531 of the swing cam 53 swings. In this way, the roller 561 moves up and down, which allows the control arm 56 to swing around the small diameter portion 572 as the swing center.

As the control arm 56 swings, the rocker arm 58 swings around the large diameter portions 571 as the swing center. As the rocker arm 58 swings, the pressing portion 584 moves up and down. This moves the intake vales 351 up and down. As a result, the opening end 9a is opened/closed by the intake valve 351.

(3-2) Adjusting Maximum Lift Amount of the Intake Valve

Now, a method of adjusting the maximum lift amount of the intake valve 351 will be described.

According to the present preferred embodiment, the rotation of the rotation shaft 357 (FIG. 9) of the motor 355 (FIG. 5) rotates the coupling gear 356 (FIG. 9) so that the control shaft 57 rotates. At the time, the small diameter portion 572 (FIG. 9) moves on a circumference centered on the axial center of the large diameter portion 571 (FIG. 9).

As shown in FIG. 7, when the small diameter portion 572 is in the closest position to the camshaft 51, the contact point A moves between the boundary portion of the lift surface 311 and the base circular surface 312 and the vicinity of the tip end of the lift surface 311.

As shown in FIG. 8, when the small diameter portion 572 is in the furthermost position from the camshaft 51, the contact point A moves between the vicinity of the tip end of the base circular surface 312 and a prescribed position (approximately in the center of the cam portion 531) on the rear end side (on the side of the base circular surface 312) of the lift surface 311. More specifically, according to the present preferred embodiment, the moving range of the contact point A can be adjusted by changing the position of the small diameter portion 572.

Here, the base circular surface 312 is formed on one circumference centered on the axial center of the fixed shaft 54. Therefore, when the contact point A moves on the base circular surface 312, the roller 561 is not moved up and down.

Meanwhile, the lift surface 311 is formed so that its distance from the axial center of the fixed shaft 54 increases toward the tip end. Therefore, when the contact point A moves on the lift surface 311, the roller 561 is pressed further downward by the cam portion 531 as the contact point A comes closer to the tip end of the lift surface 311.

Therefore, as shown in FIG. 7, when the contact point A moves from the boundary portion of the lift surface 311 and the base circular surface 312 to the vicinity of the tip end of the lift surface 311, the moving distance L1 of the roller 561 in the vertical direction is sufficiently large. This allows the vertical moving distance L2 of the pressing portion 584 of the rocker arm 58 to be sufficiently large, which increases the maximum lift amount of the intake valve 351.

Meanwhile, as shown in FIG. 8, when the contact point A moves from the vicinity of the tip end of the base circular surface 312 to a prescribed position on the rear end side of the lift surface 311, the vertical moving distance L1 of the roller 561 decreases. This allows the vertical moving distance L2 of the pressing portion 584 to decrease, so that the maximum lift amount of the intake valve 351 decreases.

As in the foregoing, according to the present preferred embodiment, the position of the small diameter portion 572 is adjusted by the motor 355 (FIG. 5), and the moving range of the contact point A is adjusted so that the maximum lift amount of the intake valve 351 can be adjusted. More specifically, when the maximum lift amount of the intake valve 351 is increased, the motor 355 is driven so that the moving range of the contact point A moves to the tip end side of the lift surface 311. When the maximum lift amount of the intake valve 351 is reduced, the motor 355 is driven so that the moving range of the contact point A moves to the tip end side of the base circular surface 312.

Therefore, according to the present preferred embodiment, the amount of air taken into the engine 7 can easily be adjusted by controlling the motor 355. As a result, the output of the engine 7 can readily be adjusted depending on various conditions.

(4) Adjusting Engine Output by the ECU

According to the present preferred embodiment, the ECU 16 adjusts the output of the engine 7 by the above-described method (by adjusting the position of the small diameter portion 572) and when a malfunction in the variable valve device 35 is detected, the output of the engine 7 is adjusted by controlling the throttle valve 622 (FIG. 3). In the following paragraphs, how the ECU 16 controls the output of the engine 7 will be described with reference to the accompanying drawings.

Figure 10:
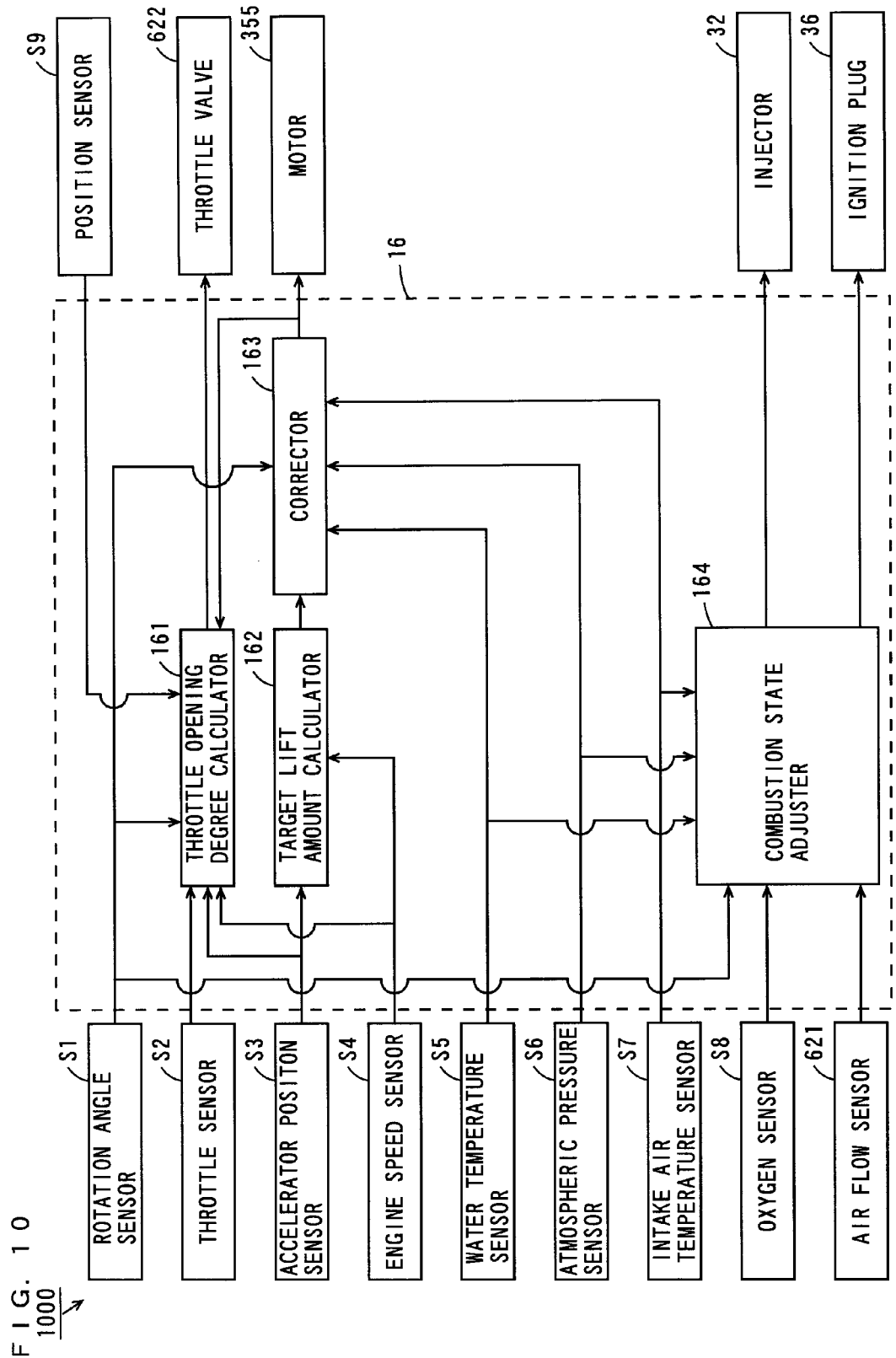
FIG. 10 is a block diagram of the structure of a control system that adjusts the output of the engine.

FIG. 10 is a block diagram of the structure of a control system that adjusts the output of the engine 7.

As shown in FIG. 10, a control system 1000 according to a preferred embodiment includes a rotation angle sensor S1, a throttle sensor S2, an accelerator position sensor S3, an engine speed sensor S4, a water temperature sensor S5, an atmospheric pressure sensor S6, an intake air temperature sensor S7, an oxygen sensor S8, an airflow sensor 621, a position sensor S9, an ECU 16, a throttle valve 622, a motor 355, an injector 32, and an ignition plug 36.

The ECU 16 includes a throttle opening degree calculator 161, a target lift amount calculator 162, a corrector 163, and a combustion state adjuster 164.

The rotation angle sensor S1 detects the rotation angle of the control shaft 57 (FIG. 9) from a reference position. The throttle sensor S2 detects the opening degree (throttle opening degree) of the throttle valve 622. The accelerator position sensor S3 detects the position (accelerator position) of the accelerator grip (not shown) provided on the handle 5 (FIG. 1). The engine speed sensor S4 detects the rotation speed (engine speed) of the engine 7 (FIG. 1).

The water temperature sensor S5 detects the temperature (water temperature) of cooling water for the engine 7. The atmospheric pressure sensor S6 detects atmospheric pressure. The intake air temperature sensor S7 detects the temperature (intake air temperature) of the air taken into the engine 7 (FIG. 1). The oxygen sensor S8 detects the oxygen concentration of the exhaust gas discharged from the engine 7. The position sensor S9 detects the gear position of the transmission (not shown) of the engine 7. The airflow sensor 621 detects the flow rate of the air passing through the second inlet pipe 262 (FIG. 5).

The throttle opening degree calculator 161 detects a malfunction in the variable valve device 35 (FIG. 5) based on a detection value by the rotation angle sensor S1 and a command value (that will be described below) applied from the corrector 163. The throttle opening degree calculator 161 controls the throttle valve 622 based on a detection value by the throttle sensor S2 and a detection value by the accelerator position sensor S3 when a malfunction in the variable valve device 35 is detected.

The target lift amount calculator 162 includes a storage that is not shown. The storage stores information representing the relationship between the accelerator position, the engine speed, and the maximum lift amount of the intake valve 351. The target lift amount calculator 162 calculates the maximum lift amount of the intake valve 351 (FIGS. 5 to 8) based on the detection values by the accelerator position sensor S2 and the engine speed sensor S4 and the information stored in the storage. Hereinafter, the maximum lift amount calculated by the target lift amount calculator 162 will be referred to as "target lift amount."

The corrector 163 corrects the target lift amount based on detection values by the water temperature sensor S5, the atmospheric pressure sensor S6, the intake air temperature sensor S7, and various other kinds of sensors. The corrector 163 gives a command value to the motor 355 (FIG. 5) so that the intake valve 351 is driven with the corrected target lift amount. In this way, the motor 355 is driven and the small diameter portion 572 (FIG. 9) is moved to a prescribed position. Consequently, the intake valve 351 is driven with the target lift amount. The corrector 163 applies the above-described command value to the throttle opening degree calculator 161.

The combustion state adjuster 164 determines the amount of fuel to be injected from the injector 32 (FIG. 5) and the injection time and the ignition time for the air-fuel mixture by the ignition plug 36 based on detection values by the rotation angle sensor S1, the water temperature sensor S5, the atmospheric pressure sensor S6, the intake air temperature sensor S7, the oxygen sensor S8, the airflow sensor 621 and other various kinds of sensors. The combustion state adjuster 164 controls fuel injection by the injector 32 based on the determined injection amount and injection time and ignition of the air-fuel mixture by the ignition plug 36 (FIG. 5) based on the determined ignition time.

Now, the control operation by the ECU 16 will be described in detail in conjunction with the flowcharts.

Figure 11:
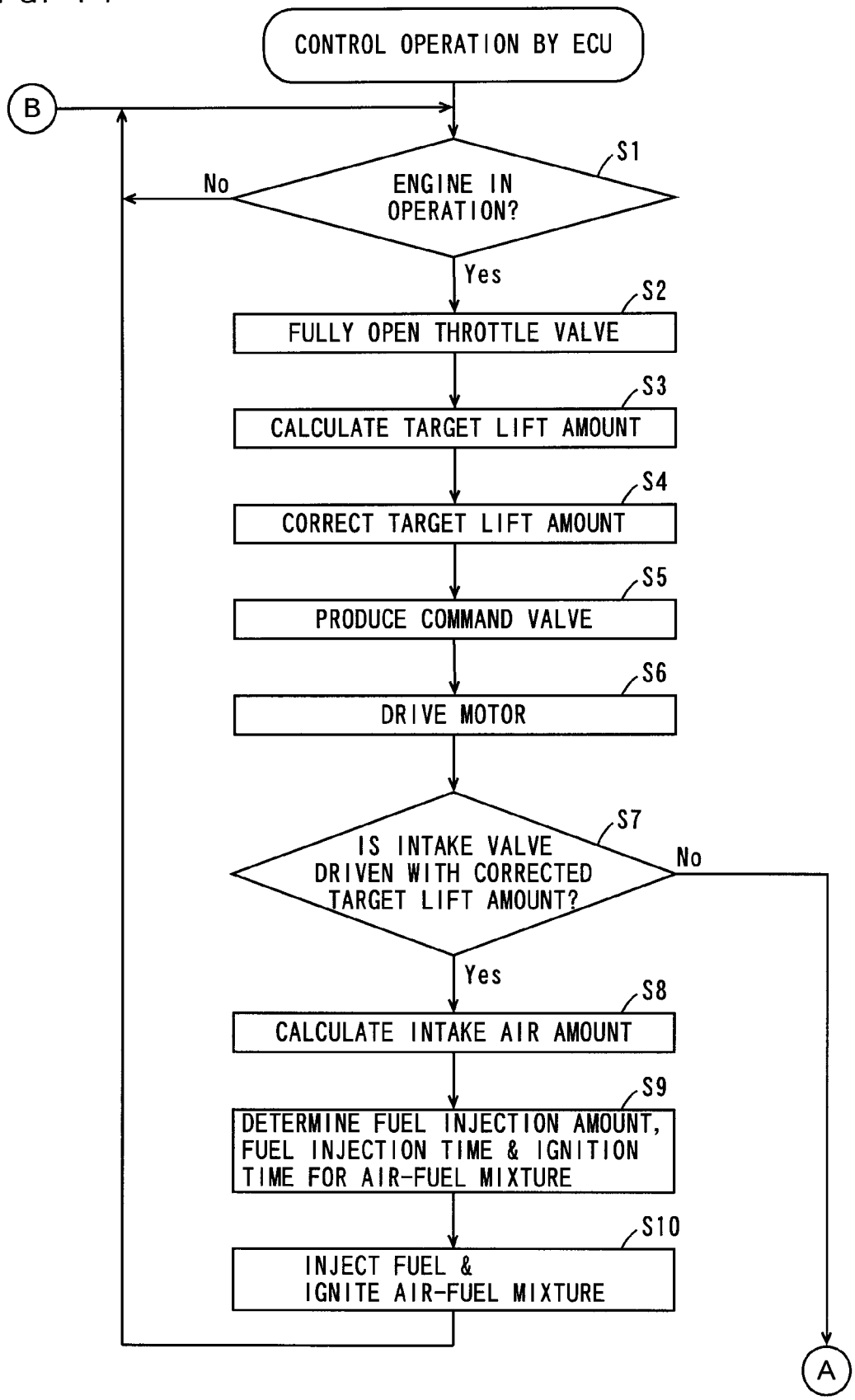
FIGS. 11 to 14 are flowcharts illustrating control operations by an ECU.

FIGS. 11 to 14 are flowcharts for use in illustrating the control operation by the ECU 16 shown in FIG. 10. As shown in FIG. 11, the throttle opening degree calculator 161 (FIG. 10) of the ECU 16 determines whether the engine 7 is in operation based on a detection value by the engine speed sensor S4 (FIG. 10) (step S1). If the engine 7 is in operation, the throttle opening degree calculator 161 fully opens the throttle valve 622 (FIGS. 3 and 10) (step S2).

Then, the target lift amount calculator 162 (FIG. 10) of the ECU 16 calculates the target lift amount of the intake valve 351 (the maximum lift amount of the intake valve 351 as a control target) based on detection values by the accelerator position sensor S3 (FIG. 10) and the engine speed sensor S4 and the information stored in the storage (step S3).

Then, the corrector 163 (FIG. 10) corrects the target lift amount based on detection values by the water temperature sensor S5 (FIG. 10), the atmospheric pressure sensor S6 (FIG. 10), and the intake air temperature sensor S7 (FIG. 10) (step S4). The corrector 163 then produces a command value to the motor 355 (FIG. 5) so that the intake valve 351 (FIG. 5) is driven with the target lift amount corrected in step S4 (step S5).

The corrector 163 then applies the command value produced in step S5 to the throttle opening degree calculator 161 and drives the motor 355 based on the command value (step S6).

The throttle opening degree calculator 161 then determines whether or not the intake valve 351 is driven with the target lift amount corrected by the corrector 163 in step S4 (step S7). Note that in step S7, the throttle opening degree calculator 161 calculates the rotation angle of the control shaft 57 that would be obtained if the motor 355 is driven based on the command value produced in step S5. The throttle opening degree calculator 161 then compares the calculated rotation angle of the control shaft 57 and the actual rotation angle of the control shaft 57 detected by the rotation angle sensor S1 and determines that the intake valve 351 is driven with the corrected target lift amount if the difference is within a prescribed range.

If it is determined in step S7 that the intake valve 351 is driven with the corrected target lift amount, the combustion state adjuster 164 (FIG. 10) determines that the variable valve device 35 operates normally, and calculates the amounts of air to be taken into the four cylinders 33 in the engine 7 based on the detection value by the airflow sensor 621, respectively (FIGS. 3 and 10) (step S8).

The combustion state adjuster 164 determines the amount of fuel to be injected from the injector 32 (FIG. 5), the injection time, and the time for igniting the air-fuel mixture by the ignition plug 36 (FIG. 5) based on the amount of air to be taken into each of the cylinders 33 calculated in step S8 and detection values by the rotation angle sensor S1, the water temperature sensor S5, the atmospheric pressure sensor S6, the intake air temperature sensor S7, the oxygen sensor S8, the airflow sensor 621, and the other sensors (step S9).

The combustion state adjuster 164 then controls the fuel injection by the injector 32 based on the fuel injection amount and the fuel injection time determined in step S9 and controls ignition of the air-fuel mixture by the ignition plug 36 based on the ignition time determined in step S9 (step S10). The ECU 16 then returns to step S1.

In step S1, if the engine 7 is not in operation, the ECU 16 stands by until the engine 7 operates.

Figure 12:
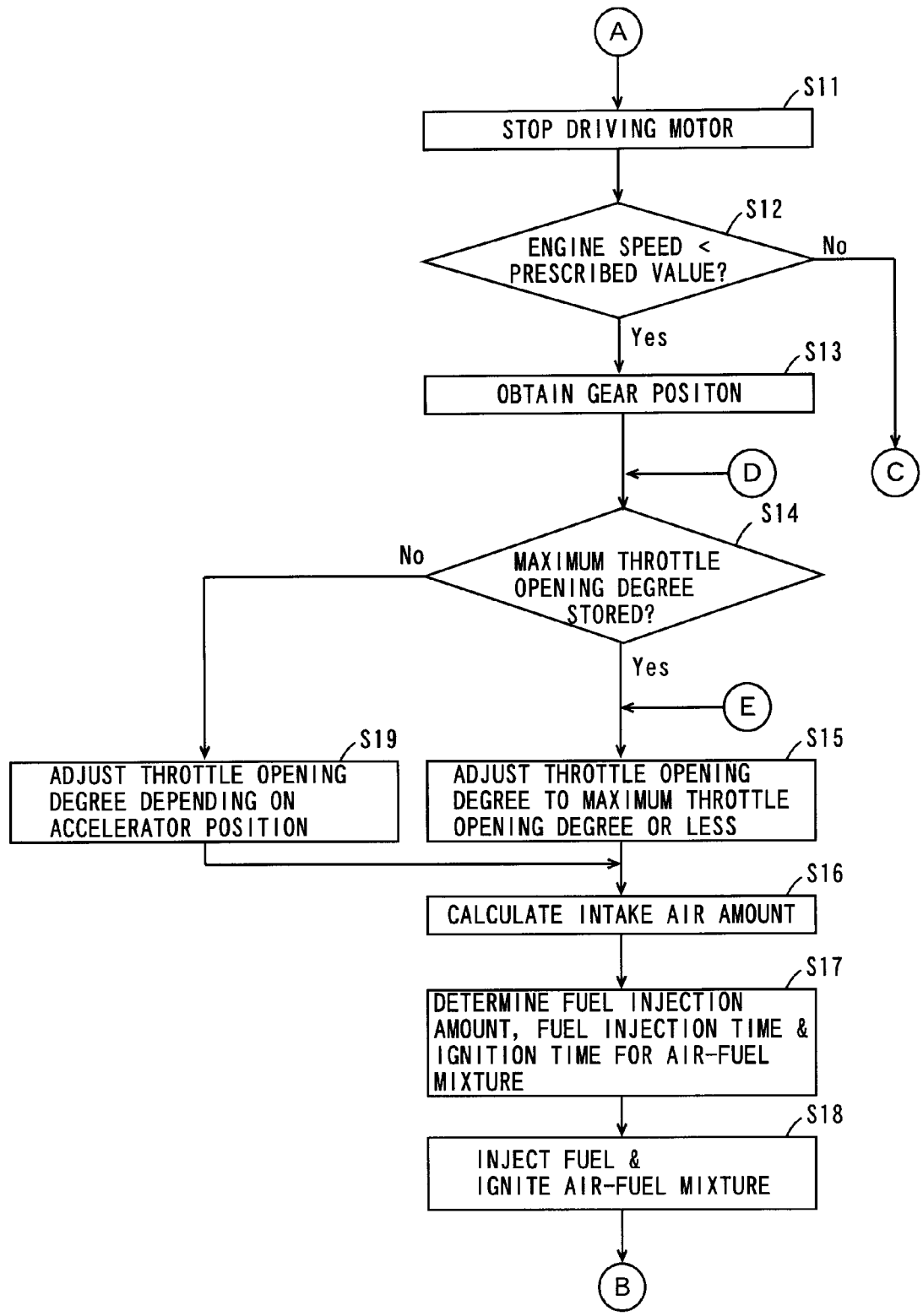

If it is determined in step S7 that the intake valve 351 (FIG. 5) is not driven with the target lift amount corrected in step S4, the corrector 163 determines that the variable valve device 35 (FIG. 5) has a malfunction and stops driving the motor 355 (FIG. 5) as shown in FIG. 12 (step S11). In this way, the control shaft 57 (FIG. 9) is fixed and the driving of all four intake valves 351 in the engine 7 is stopped.

Then, the throttle opening degree calculator 161 determines whether the rotation speed of the engine 7 is smaller than a prescribed value (such as 3000 rpm) based on a detection value by the engine speed sensor S4 (step S12). Note that the prescribed values in step S12 and in step S27 in FIG. 14 that will be described below are stored in advance in a storage that is not shown in the throttle opening degree calculator 161.

If the rotation speed of the engine 7 is smaller than the prescribed value, the throttle opening degree calculator 161 obtains the gear position of a transmission (not shown) from the position sensor S9 (FIG. 10) (step S13).

The throttle opening degree calculator 161 determines whether or not the maximum throttle opening degree (that will be described below, see step S28 in FIG. 14) corresponding to the gear position obtained in step S13 is stored in the storage (step S14).

If the maximum throttle opening degree is stored, the throttle opening degree calculator 161 adjusts the opening degree of the throttle valve 622 (throttle opening degree) based on a detection value (accelerator position) by the accelerator position sensor S3 within a range not exceeding the maximum throttle opening degree (step S15).

The combustion state adjuster 164 then calculates the amounts of air to be taken into the four cylinders 33 in the engine 7 based on a detection value by the airflow sensor 621 (step S16).

The combustion state adjuster 164 then determines the amount of fuel to be injected from the injector 32, the fuel injection time, and the time for igniting air-fuel mixture by the ignition plug 36 based on the amounts of air to be taken into the cylinders 33 calculated in step S16 and detection values by the rotation angle sensor S1, the water temperature sensor S5, the atmospheric pressure sensor S6, the intake air temperature sensor S7, the oxygen sensor S8, the airflow sensor 621 and other sensors (step S17).

The combustion state adjuster 164 then controls the fuel injection by the injector 32 based on the fuel injection amount and the fuel injection time determined in step S17 and ignition of the air-fuel mixture by the ignition plug 36 based on the ignition time determined in step S17 (step S18). Then, the ECU 16 returns to step S1 in FIG. 11.

If the maximum throttle opening degree is not stored in step S14 in FIG. 12, the throttle opening degree calculator 161 adjusts the opening degree of the throttle valve 622 (throttle opening degree) based on the detection value (accelerator position) of the accelerator position sensor S3 (step S19). The ECU 16 then proceeds to step S16.

Figure 13:
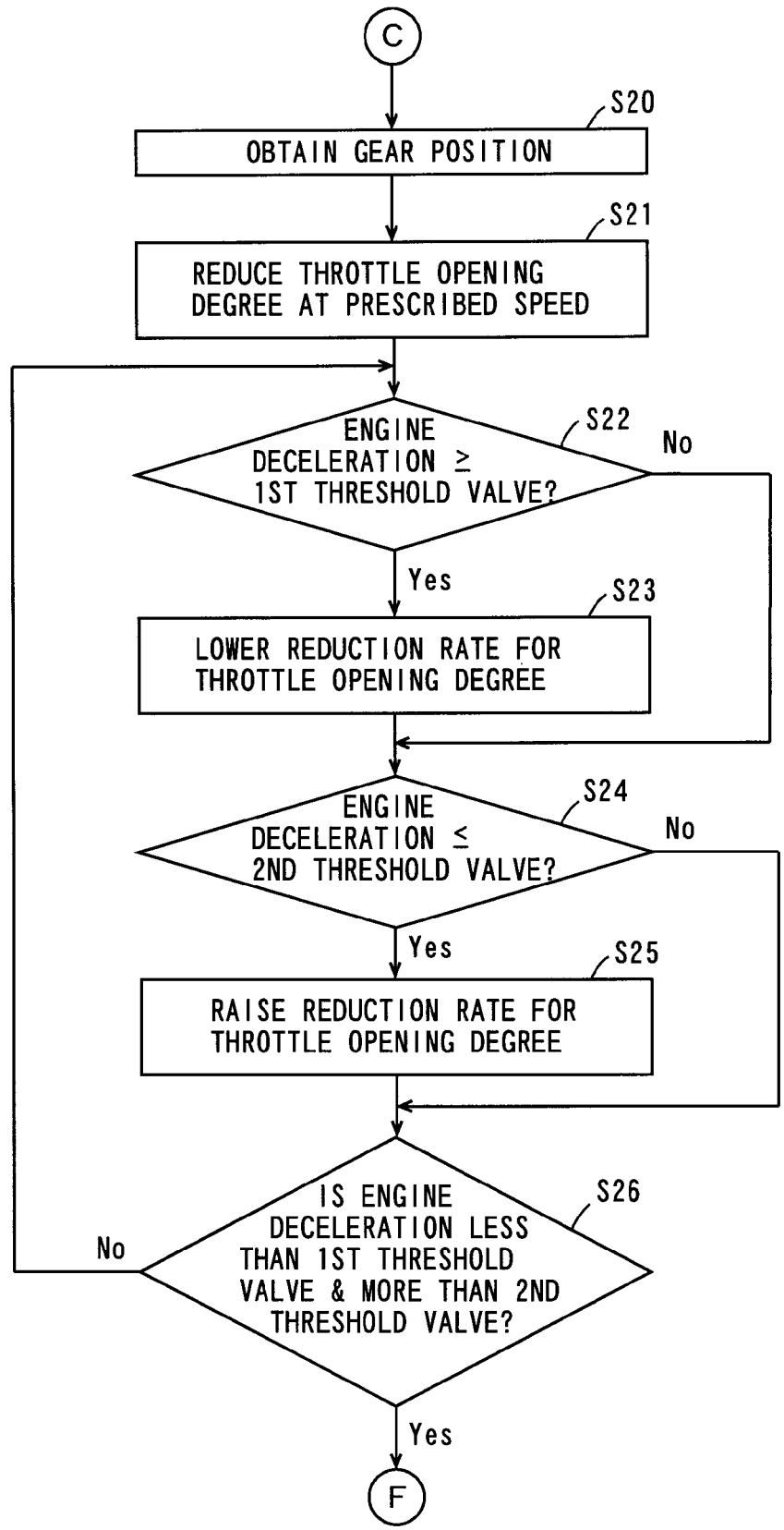

If the rotation speed of the engine 7 is not less than a prescribed value in step S12, the throttle opening degree calculator 161 (FIG. 10) obtains the gear position of the transmission that is not shown as shown in FIG. 13 (step S20).

The throttle opening degree calculator 161 then reduces the opening degree of the throttle valve 622 at a reduction rate corresponding to the gear position obtained in step S20 (step S21). Note that the reduction rate in step S21 refers to a change with time in the reduction of the throttle opening degree. The reduction rate of the throttle opening degree for each gear position is stored in advance in the storage (not shown) of the throttle opening degree calculator 161.

By the process in step S21, the rotation speed of the engine 7 or the speed of the motorcycle 100 (FIG. 1) is gradually lowered, and therefore the rider can easily determine that there is a malfunction in the variable valve device 35 (FIG. 5).

The throttle opening degree calculator 161 then determines whether the deceleration of the engine 7 is a first threshold value (for example, about 1250 rpm) or more based on the detection value of the engine speed sensor S4 (step S22). Note that the deceleration in step S22 refers to the negative acceleration of the engine 7. Therefore, if the acceleration of the engine 7 corresponds to a negative value, the deceleration is calculated as a positive value by the throttle opening degree calculator 161, while if the acceleration of the engine 7 corresponds to a positive value, the deceleration is calculated as a negative value. The first threshold value and a second threshold value that will be described below are stored in advance in the storage (not shown) of the throttle opening degree calculator 161. The first and second threshold values are both set as positive values and the first threshold value is larger than the second threshold value.

If the deceleration of the engine 7 is equal to or more than the first threshold value, the throttle opening degree calculator 161 reduces the reduction rate of the throttle opening degree (step S23). By this processing, the speed of the motorcycle 100 (FIG. 1) can gradually be lowered so that the traveling stability of the motorcycle 100 improves.

The throttle opening degree calculator 161 then determines whether or not the deceleration of the engine 7 is equal to or lower than the second threshold value (for example, about 1000 rpm) (step S24). If the deceleration of the engine 7 is equal to or lower than the second threshold value, the throttle opening degree calculator 161 raises the reduction rate of the throttle opening degree (step S25). By this process, when there is a malfunction in the variable valve device 35 the speed of the motorcycle 100 can quickly be lowered.

Figure 14:
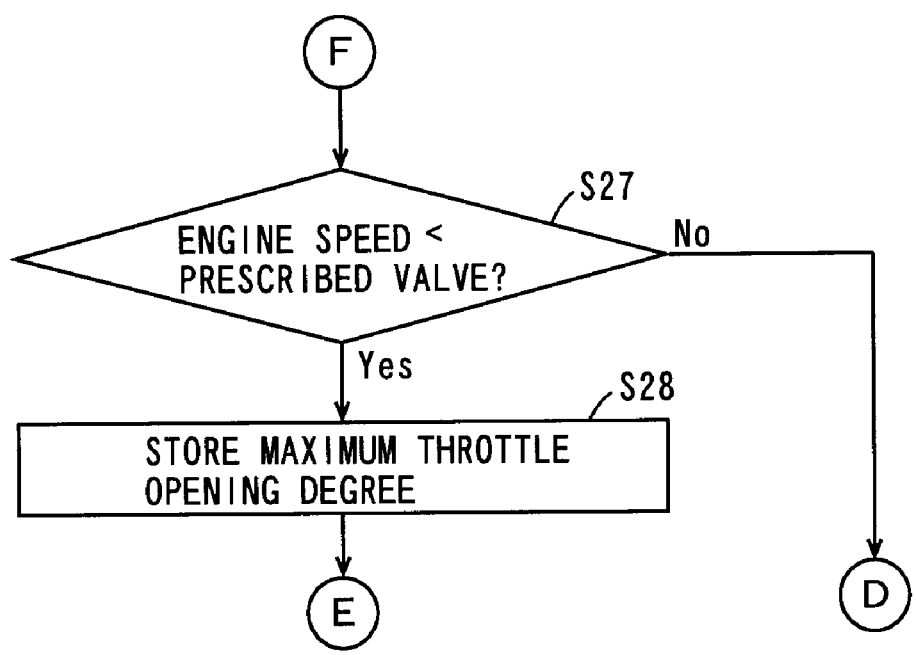

The throttle opening degree calculator 161 determines whether or not the deceleration of the engine 7 is smaller than the first threshold value and larger than the second threshold value (step S26). If the deceleration of the engine 7 is smaller than the first threshold value and larger than the second threshold value, the throttle opening degree calculator 161 determines that the motorcycle 100 is appropriately decelerated and determines whether or not the rotation speed of the engine 7 is smaller than a prescribed value (for example, about 3000 rpm) based on the detection value of the engine speed sensor S4 as shown in FIG. 14 (step S27).

If the rotation speed of the engine 7 is smaller than the prescribed value, the throttle opening degree calculator 161 determines that the motorcycle 100 has sufficiently been decelerated, obtains a throttle opening degree from the throttle sensor S2 and stores the throttle opening degree as the maximum throttle opening degree in the storage (step S28). Then, the ECU 16 proceeds to step S15 in FIG. 12. In step S15, as described above, the throttle opening degree is adjusted within a range less than the maximum throttle opening degree. In this way, if the rider increases the accelerator position by mistake, the sufficiently decelerated motorcycle 100 can be prevented from being greatly accelerated again. Therefore, the traveling stability of the motorcycle 100 can surely be improved.

In step S22 in FIG. 13, if the deceleration of the engine 7 is less than the first threshold value, the ECU 16 proceeds to the process in step S24. In step S24, if the deceleration of the engine 7 is larger than the second threshold value, the ECU 16 proceeds to the process in step S26.

In step S26, if the deceleration of the engine 7 is not less than the first threshold value or not more than the second threshold value, the ECU 16 returns to step S22. In this way, the deceleration of the engine 7 can surely be converged between the first and second threshold values. Consequently, the traveling stability of the motorcycle 100 can surely be improved.

In step S27 in FIG. 14, if the rotation speed of the engine 7 is not less than a prescribed value, the ECU 16 proceeds to step S14 in FIG. 12.

As in the foregoing, according to the present preferred embodiment, if a malfunction in the variable valve device 35 is detected by the ECU 16, the adjustment of the amount of intake air by the variable valve device 35 is stopped and the adjustment of the amount of air to be taken by the throttle valve 622 is started. In this way, the output of the engine 7 can be stabilized, so that the traveling performance of the motorcycle 100 can be improved.

Note that the throttle opening degree calculator 161, the target lift amount calculator 162, the corrector 163, and the combustion state adjuster 164 shown in FIG. 10 may be implemented by a CPU (Central Processing Unit) and programs, or part or all of the elements may be implemented by hardware such as electronic circuits.

(5) Effects of the Present Preferred Embodiment

As described above, in the motorcycle 100 according to the present preferred embodiment, the airflow sensor 621 and the throttle valve 622 are arranged in the intake passage 11 to provide air into the engine 7. Therefore, if there is a malfunction in the operation of the variable valve device 35, the use of the airflow sensor 621 and the throttle valve 622 allows an appropriate amount of air to be taken into each of the cylinders 33 in the engine 7. Therefore, the output of the engine 7 can be stabilized. Consequently, the traveling performance of the motorcycle 100 is improved.

The airflow sensor 621 is provided in the air inlet pipe 26. Here, the air inlet pipe 26 is attached to the main frame 1. In this case, the vibration of the airflow inlet pipe 26 is minimized so that the vibration of the airflow sensor 621 can be minimized. In this way, the detection precision of the airflow sensor 621 can be improved. Therefore, the traveling performance of the motorcycle 100 can surely be improved.

The airflow inlet pipe 26 is attached to the mainframe 1 through the vibration buffer member 25. In this way, vibration generated at the airflow inlet pipe 26 can be attenuated through the vibration buffer member 25. In this way, the detection precision of the airflow sensor 621 can sufficiently be improved.

The airflow sensor 621 is provided in the front portion of the main frame 1. In this way, there is a sufficient distance secured between the airflow sensor 621 and the engine 7. Therefore, if there is a blow-back of air and burned gas into the intake passage 11 caused by intake pulsation at the engine 7, the airflow sensor 621 can be prevented from being affected by the blow-back (from being damaged by the high air pressure and the high temperature of the burned gas, for example). Consequently, the reliability of the airflow sensor 621 can be prevented from decreasing.

The air cleaner element 30 is provided between the airflow sensor 621 and the engine 7. In this way, the use of the air cleaner element 30 can surely prevent the airflow sensor 621 from being affected by the blow-back. Therefore, the reliability of the airflow sensor 621 can further be improved.

In addition, since a space for preventing the effect of the blow-back upon the airflow sensor 30 is not necessary in the intake passage 11, the intake passage 11 can be simplified and more compact. In this way, the motorcycle 100 can be produced more easily and reduced in size.

The air cleaner element 611 is provided ahead of the airflow sensor 621 in the intake passage 11. In this way, the airflow sensor 621 and the throttle valve 622 can be prevented from gathering dust or the like from the outside air. Consequently, the operation performance of the airflow sensor 621 and the throttle valve 622 can sufficiently be improved.

The airflow sensor 621 and the throttle valve 622 are provided in the air inlet pipe 26. In this way, the air inlet pipe 26 including the airflow sensor 621 and the throttle valve 622 may be produced as a unit and attached to the main frame 1. This allows the airflow sensor 621 and the throttle valve 622 to be more easily attached to the motorcycle 100. Consequently, the motorcycle 100 can be produced more easily.

(6) Modifications (6-1) Other Structure Examples

In the above described preferred embodiments, the air inlet pipe 26 is attached to the main frame 1, while the main frame 1 and the air inlet pipe 26 may be formed integrally. In this way, the vibration of the air inlet pipe 26 can sufficiently be minimized. This allows the airflow sensor 621 to have improved detection precision. Consequently, the traveling performance of the motorcycle 100 can surely be improved.

Instead of the variable valve devices 35 described in conjunction with FIGS. 5 to 9, an electromagnetic valve may be provided in each of the cylinders 33.

In the above-described preferred embodiments, the motorcycle 100 includes a four-cylinder engine 7. The number of cylinders in the engine 7 is not limited to 4 and a six- or eight-cylinder engine or any engine with another number of cylinders may be provided in the motorcycle 100.

In the above-described preferred embodiments, a malfunction in the variable valve device 35 can be detected in step S7 in FIG. 11 and an alarm such as an alarm lamp and/or an alarm buzzer may be provided on the motorcycle 100 so that the rider can be informed of the malfunction in the variable valve device 35 by the alarm.

(6-2) Other Control Examples

In the control operation by the ECU 16 described in conjunction with FIGS. 11 to 14, the throttle valve 622 (FIG. 3) is fully opened when there is no malfunction in the variable valve device 35, while the opening degree of the throttle valve 622 may be adjusted when there is no malfunction in the variable valve device 35.

When, for example, the maximum lift amount of the intake valve 351 (FIG. 5) is small or the rotation speed of the engine 7 is low, the opening degree of the throttle valve 622 may be adjusted. In this case, when the motorcycle 100 travels at low speed, an appropriate amount of air can stably be supplied to the cylinders 33. In this way, the traveling performance of the motorcycle 100 can surely be improved.

In the above-described preferred embodiments, a malfunction in the variable valve device 35 is detected by the ECU 16 based on a command value from the motor 355 and the detection value of the rotation angle sensor S1 in step S7 in FIG. 11, but a malfunction in the variable valve device 35 may be detected by the ECU 16 according to other methods. For example, a malfunction in the variable valve device 35 may be detected by the ECU 16 based on a detected current value at the motor 355. Alternatively, when the detection value of the rotation angle sensor S1 does not change for a prescribed period, the ECU 16 may detect a malfunction in the variable valve device 35.

If an electromagnetic valve is provided in each of the cylinders 33 instead of the variable valve device 35, the ECU 16 may detect the operation state of each of the electromagnetic valves. In this case, if there is a malfunction in an electromagnetic valve in at least one of the cylinders 33, adjustment of the amount of intake air by the airflow sensor 621 and the throttle valve 622 may be started.

In this way, if there is a malfunction in any of the electromagnetic valves in the cylinders 33, the output of the cylinder 33 with the malfunction can be prevented from being greatly different from the outputs of the other cylinders 33. Consequently, the traveling performance of the motorcycle 100 can surely be improved.

In step S8 in FIG. 11, the ECU 16 calculates the amounts of air to be taken into the cylinders 33 based on the detection value of the airflow sensor 621, and the amounts of air to be taken into the cylinders 33 may be calculated based on the detection values of the rotation angle sensor S1 (FIG. 10) and the engine speed sensor S4 (FIG. 10). In this way, the amounts of air to be taken into the cylinders 33 are calculated based on the maximum lift amount of the intake valve 351 and the rotation speed of the engine 7, so that the amounts of air to be taken into the cylinders 33 can be calculated quickly and precisely. Therefore, the traveling performance of the motorcycle 100 can even more be improved.

In the above-described preferred embodiments, the engine 7 continues to be operated when there is a malfunction in the variable valve device 35, while the operation of the engine 7 may be stopped if a prescribed condition is fulfilled upon such a malfunction in the variable valve device 35. For example, if it is determined in step S27 in FIG. 14 that the rotation speed of the engine 7 is smaller than a prescribed value, the fuel combustion may be stopped to stop the operation of the engine 7. In this case, the operation of the engine 7 is stopped as the motorcycle 100 is sufficiently decelerated, so that the motorcycle 100 can readily be stopped.

Second Preferred Embodiment

A motorcycle according to a second preferred embodiment of the present invention is different from the motorcycle 100 according to the first preferred embodiment shown in FIGS. 1 to 5 in the following points.

Figure 15:
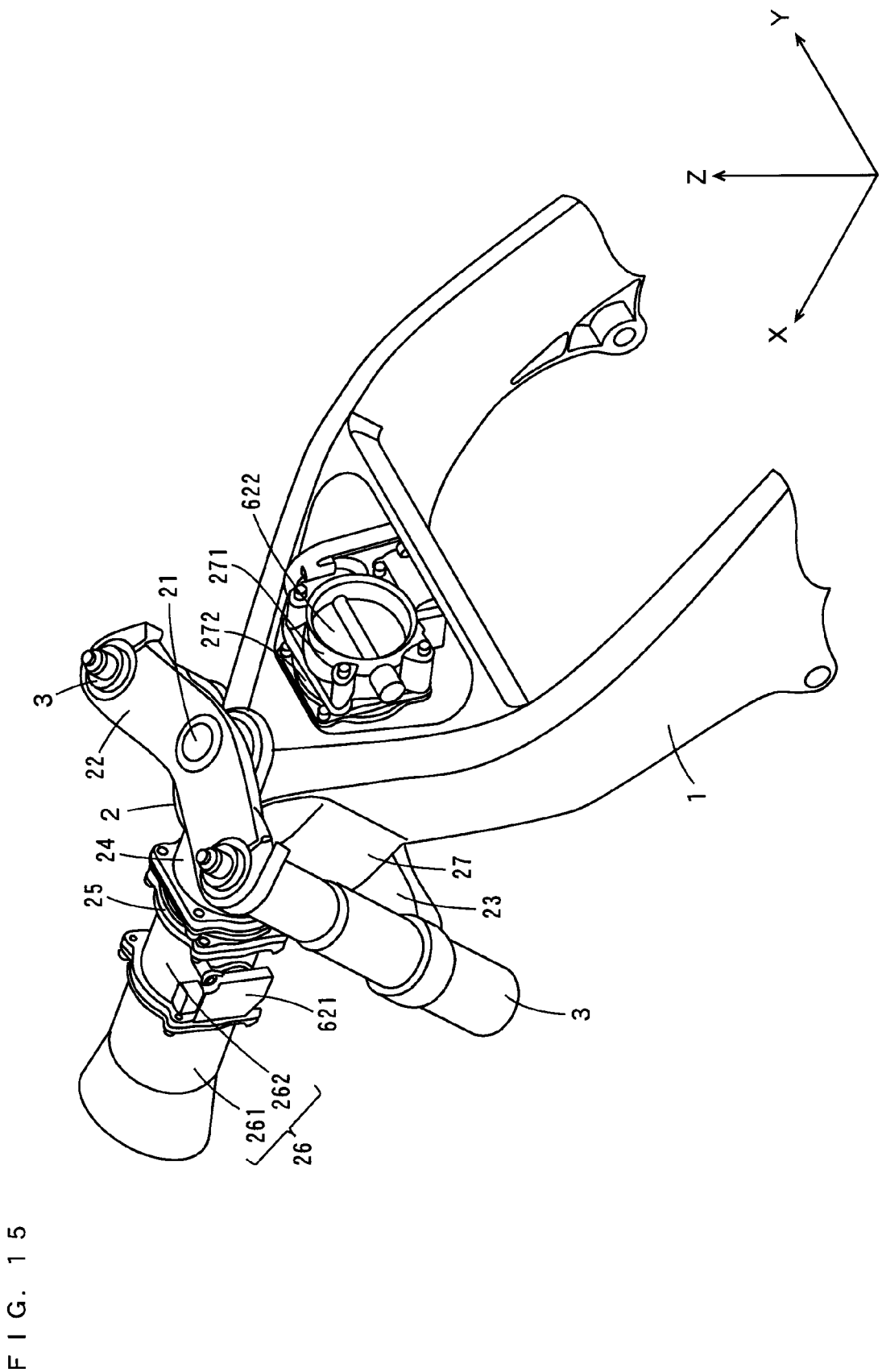
FIGS. 15 to 17 are views illustrating the structure of an intake passage for a motorcycle according to a second preferred embodiment and its periphery.
Figure 16:
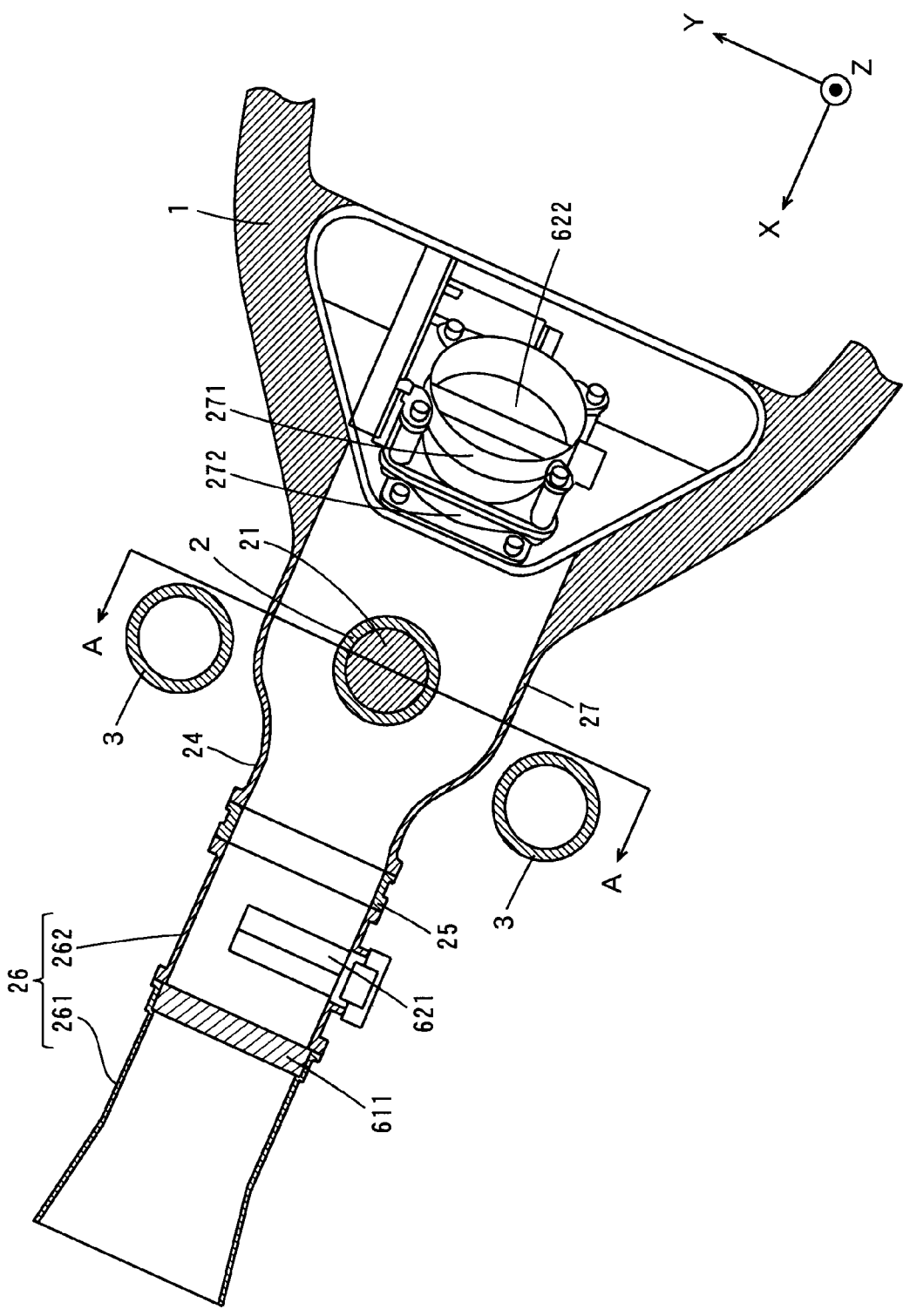
Figure 17:
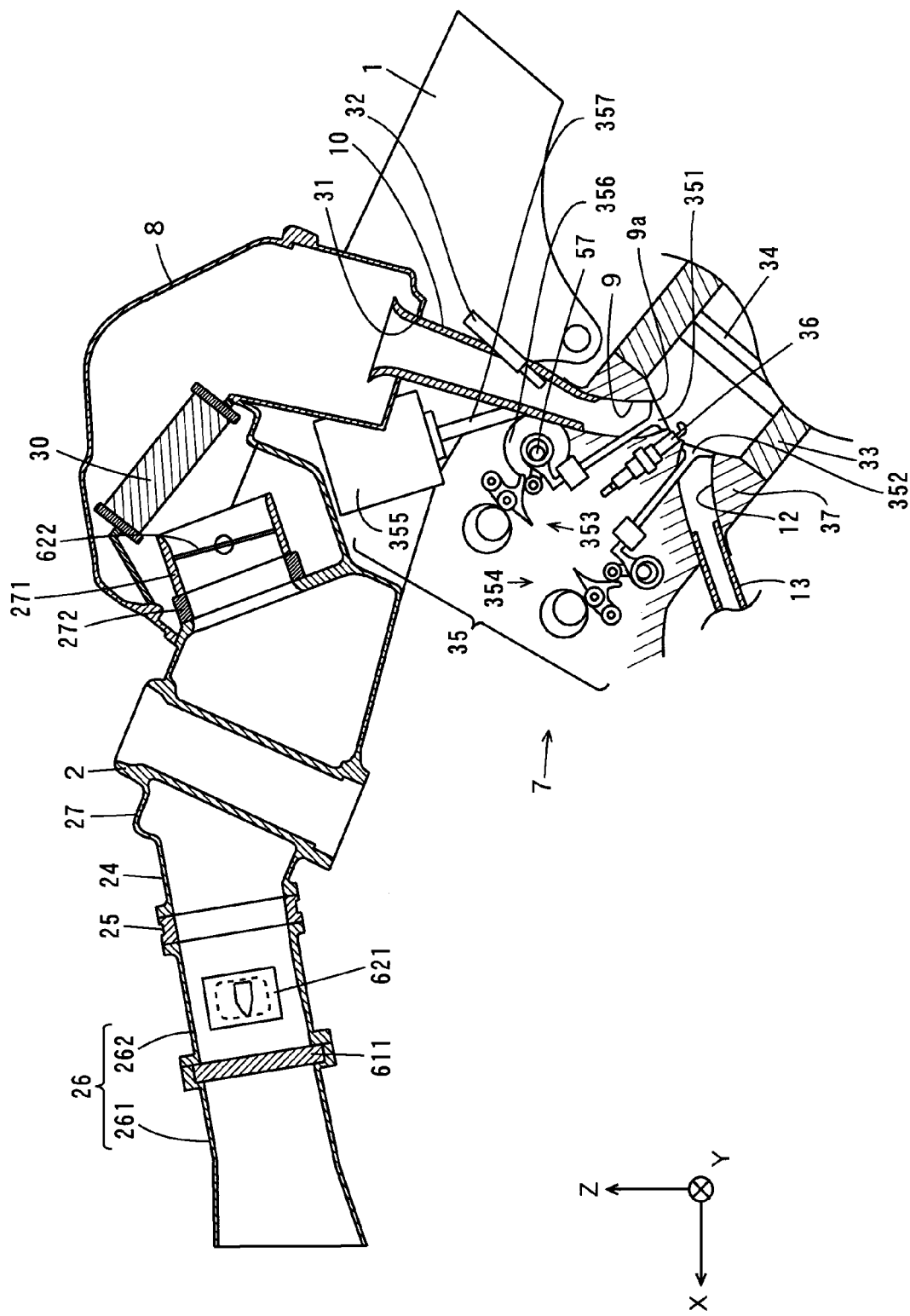

FIGS. 15 to 17 are views for use in illustrating the structure of the intake passage 11 (see FIG. 1) for the motorcycle according to the second preferred embodiment and its periphery. Note that the side view of the motorcycle according to the second preferred embodiment is the same as FIG. 1 and the A-A sectional view in FIG. 16 is the same as FIG. 4.

As shown in FIGS. 15 to 17, in the second preferred embodiment, an airflow pipe 271 is provided at the rear of the airflow box 27. A throttle valve 622 is provided in the airflow pipe 271. The airflow pipe 271 is connected to the airflow box 27 through a buffer member 272. In the present preferred embodiment, the air in the airflow box 27 is let into the air cleaner box 8 through the airflow pipe 271.

In the motorcycle according to the present preferred embodiment, the throttle valve 622 is provided at the boundary between the air cleaner box 8 and the airflow box 27. In this case, the distance between the throttle valve 622 and the engine 7 is reduced, so that the amount of air taken into the engine 7 can be precisely adjusted by the throttle valve 622. In this way, the traveling performance of the motorcycle can sufficiently be improved.

The airflow pipe 271 is attached to the airflow box 27 through the buffer member 272. In this way, vibration generated at the airflow pipe 271 can be attenuated by the buffer member 272. Therefore, the reliability of the throttle valve 622 can be improved.

The throttle valve 622 is preferably provided at the rear of the head pipe 2. In this way, the throttle valve 622 can be protected against extraneous effects. Therefore, the reliability of the throttle valve 622 can be even more improved.

Third Preferred Embodiment

A motorcycle according to a third preferred embodiment is different from the motorcycle according to the first preferred embodiment shown in FIGS. 1 to 5 in the following points.

Figure 18:
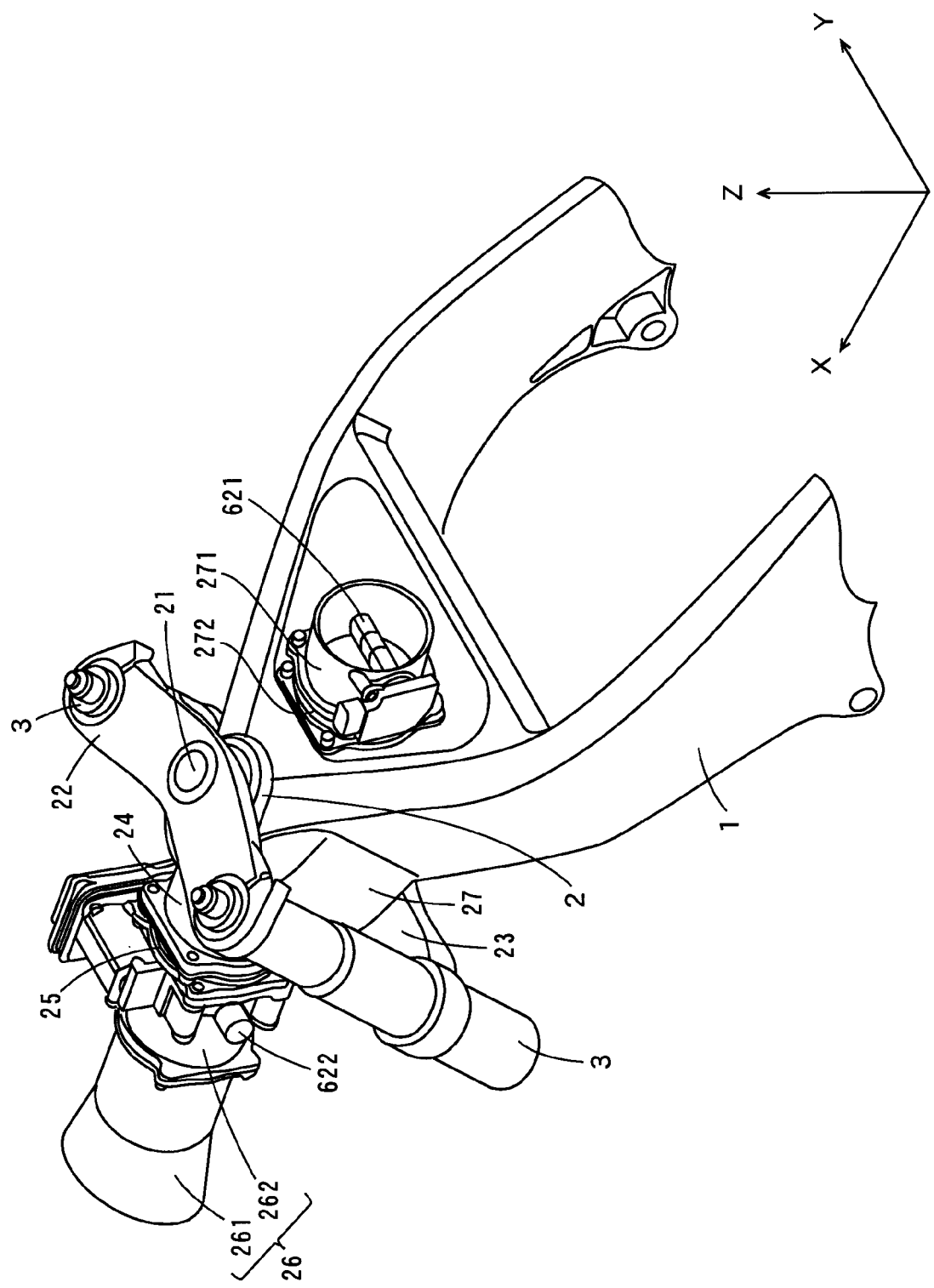
FIGS. 18 to 20 are views illustrating the structure of an intake passage for a motorcycle according to a third preferred embodiment and its periphery.
Figure 19:
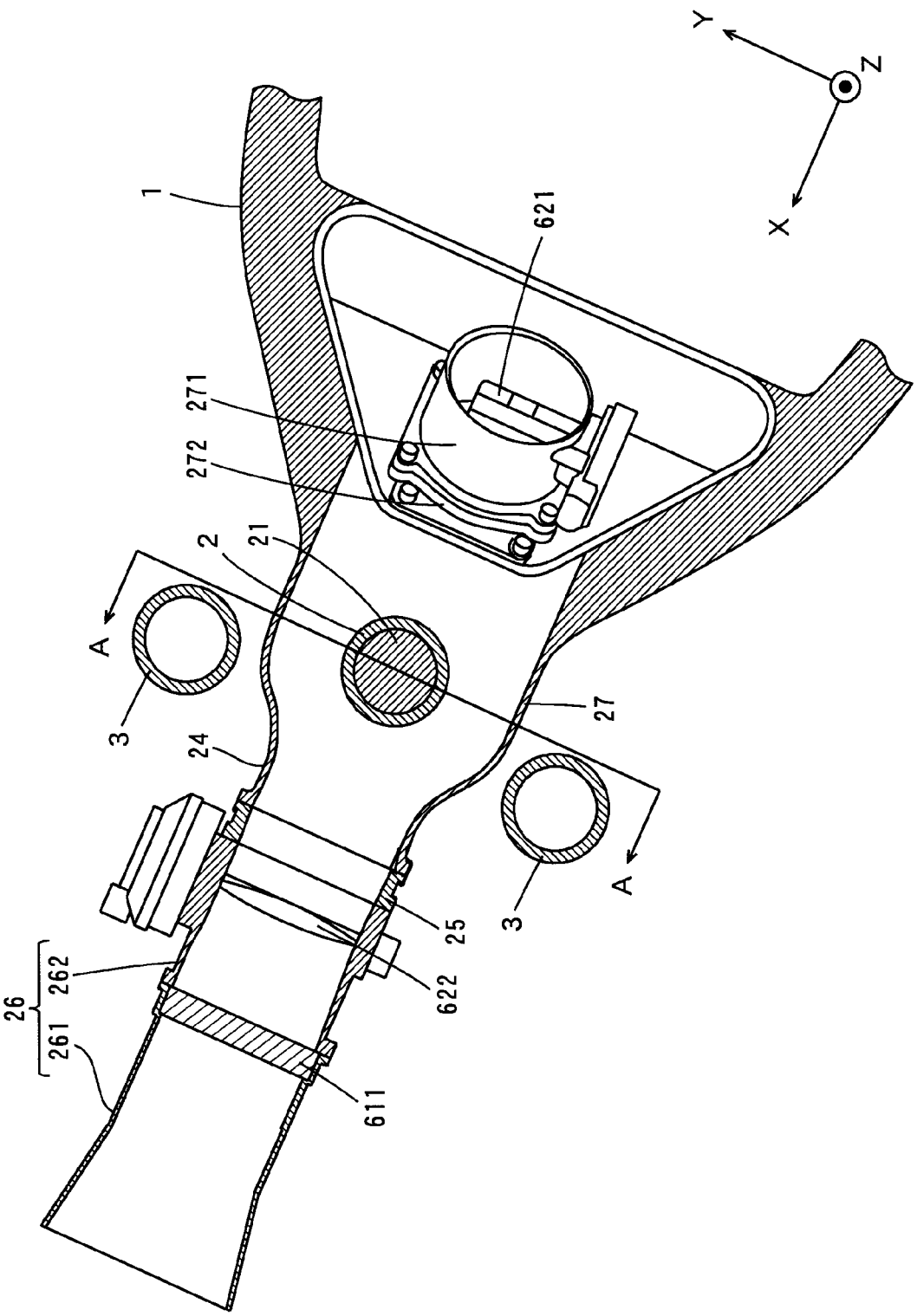
Figure 20:
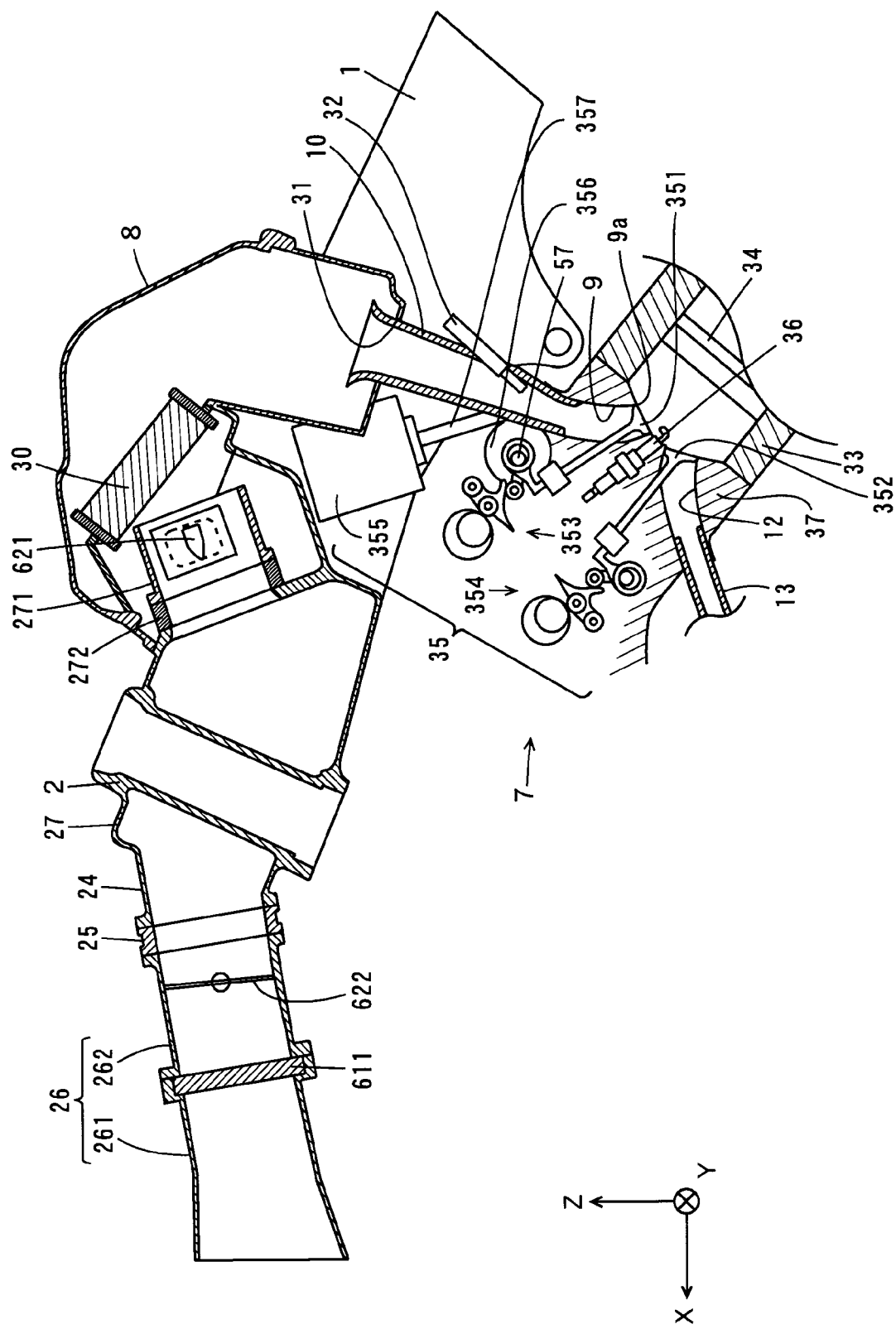

FIGS. 18 to 20 are views for use in illustrating the structure of the intake passage 11 (see FIG. 1) for the motorcycle according to the third preferred embodiment and its periphery. Note that the side view of the motorcycle according to the third preferred embodiment is the same as FIG. 1 and the A-A sectional view in FIG. 19 is the same as FIG. 4.

As shown in FIGS. 18 to 20, in the present preferred embodiment, an airflow pipe 271 is provided at the rear of the airflow box 27. An airflow sensor 621 is provided in the airflow pipe 271. The airflow pipe 271 is connected to the airflow box 27 through the buffer member 272. According to the present preferred embodiment, the air in the airflow box 27 is let into the air cleaner box 8 through the airflow pipe 271.

In the motorcycle according to the present preferred embodiment, the airflow sensor 621 is provided at the boundary between the air cleaner box 8 and the airflow box 27. In this way, the distance between the airflow sensor 621 and the engine 7 is reduced, so that the amount of air taken into the engine 7 can be detected precisely by the airflow sensor 621. Therefore, the traveling performance of the motorcycle can sufficiently be improved.

The airflow pipe 271 is attached to the airflow box 27 through the buffer member 272. In this case, vibration generated at the airflow pipe 271 can be attenuated through the buffer member 272. Therefore, the reliability and detection precision of the airflow sensor 621 can surely be improved.

According to the present preferred embodiment, the airflow sensor 621 is preferably provided at the rear of the head pipe 2. Therefore, the airflow sensor 621 can be protected against extraneous effects. Therefore, the reliability of the airflow sensor 621 can sufficiently be improved.

A sufficient distance can be secured between the airflow sensor 621 and the front end of the first inlet pipe 261. Therefore, the airflow sensor 621 can surely be protected against extraneous effects, so that the reliability of the airflow sensor 621 can be even more improved.

Other Preferred Embodiments

In the first preferred embodiment, the airflow sensor 621 is preferably provided ahead of the throttle valve 622, while the throttle valve 622 may be provided ahead of the airflow sensor 621.

In the second and third preferred embodiments, one of the airflow sensor 621 and the throttle valve 622 is preferably provided at the rear of the head pipe 2, while both the airflow sensor 621 and the throttle valve 622 may be provided at the rear of the head pipe 2.

In this case, the airflow sensor 621 and the throttle valve 622 can surely be protected against extraneous effects. Therefore, the reliability of the airflow sensor 621 and the throttle valve 622 may surely be improved.

Correspondence Between Elements in Claims and Elements in the Preferred Embodiments In the following paragraph, non-limiting examples of correspondences between various elements recited in the claims and those in the preferred embodiments will be described.

In the above-described preferred embodiments, the air cleaner element 30 is an example of the first filter, the airflow sensor 621 is an example of the flow rate detector, the throttle valve 622 is an example of the flow rate adjuster, the air cleaner element 611 is an example of the second filter, the air inlet pipe 26 is an example of the inlet pipe, the ECU 16 is an example of the state detector and the controller, the rear wheel 18 is an example of the driving wheel, and the rear wheel driven sprocket 19 and the chain 20 are an example of the transmission mechanism.

Various other elements having arrangements or functions as recited in the claims may be employed as the elements in the claims.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An intake system that allows air to be taken into an engine in a motorcycle, comprising:
   an intake passage provided on a main frame of the motorcycle and arranged to guide outside air into a cylinder in the engine;
   a first filter provided in the intake passage;
   a flow rate detector provided at an upstream side of the first filter in the intake passage and arranged to detect a flow rate of air; and a flow rate adjuster arranged to adjust the flow rate of air taken into the cylinder through the intake passage based on the flow rate detected by the flow rate detector.

2. The intake system according to claim 1, further comprising a continuously variable valve device that drives an intake valve so that a maximum displacement of the intake valve of the engine can be continuously varied in response to an engine speed of the engine and an accelerator operation by a rider.

3. The intake system according to claim 2, further comprising a state detector that detects a state of the continuously variable valve device; and a controller programmed to adjust the amount of air taken into the cylinder by controlling the continuously variable valve device; wherein the controller is programmed to stop adjusting the amount of air by controlling the continuously variable valve device and programmed to start adjusting the amount of air by controlling the flow rate adjuster when the state detector detects a prescribed state of the continuously variable valve device.

4. The intake system according to claim 3, wherein the controller is programmed to control the flow rate adjuster so that the amount of air taken into the cylinder is reduced in a prescribed ratio when the state detector detects the prescribed state.

5. The intake system according to claim 2, further comprising an engine speed detector that detects the engine speed of the engine; wherein the controller is programmed to stop adjusting the amount of air by controlling the continuously variable valve device and programmed to start adjusting the amount of air by controlling the flow rate adjuster when the engine speed detected by the engine speed detector is smaller than a prescribed value.

6. The intake system according to claim 1, further comprising a second filter provided at an upstream side of the flow rate adjuster and the flow rate detector in the intake passage.

7. The intake system according to claim 1, wherein the main frame is arranged to extend in a lengthwise direction of the motorcycle;

the intake passage includes an inlet pipe that is provided in a front portion of the main frame and allows outside air to come into the intake passage; and at least one of the flow rate detector and the flow rate adjuster is provided at the inlet pipe.

8. The intake system according to claim 7, wherein the inlet pipe is integral with the main frame.

9. The intake system according to claim 7, further comprising a vibration buffer arranged between the inlet pipe and the main frame.

10. The intake system according to claim 1, wherein the main frame includes a plurality of branched portions extending from a front end to a rear end; and the flow rate detector is arranged between the plurality of branched portions.

11. The intake system according to claim 1, wherein the main frame includes a plurality of branched portions extending from a front end to a rear end; and the flow rate adjuster is arranged between the plurality of branched portions.

12. A motorcycle, comprising:
a main frame;
a driving wheel provided rotatably on the main frame;
an engine that generates power;
a transmission mechanism that transmits the power generated by the engine to the driving wheel; and
an intake system that allows air to come into a cylinder in the engine, the intake system including:
an intake passage provided in the main frame and arranged to guide outside air into a cylinder in the engine;
a first filter provided in the intake passage;
a flow rate detector provided at an upstream side of the first filter in the intake passage and arranged to detect a flow rate of air; and
a flow rate adjuster arranged to adjust the flow rate of air taken into the cylinder through the intake passage based on the flow rate detected by the flow rate detector.

13. The intake system according to claim 3, wherein the prescribed state of the continuously variable valve device is a malfunction of the continuously variable valve device.

* * * * *